(12) United States Patent
Nakagawa et al.

(10) Patent No.: US 10,392,528 B2
(45) Date of Patent: Aug. 27, 2019

(54) POLYISOCYANATE COMPOSITION, POLYURETHANE RESIN, AND COATING

(71) Applicant: MITSUI CHEMICALS, INC., Tokyo (JP)

(72) Inventors: Toshihiko Nakagawa, Ichihara (JP); Aya Nakagawa, Sodegaura (JP); Shinji Kiyono, Kimitsu (JP); Takashi Kanno, Shizuoka (JP); Hirokazu Morita, Chiba (JP); Satoshi Yamasaki, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 7 days.

(21) Appl. No.: 15/571,755

(22) PCT Filed: May 9, 2016

(86) PCT No.: PCT/JP2016/063699
§ 371 (c)(1),
(2) Date: Nov. 3, 2017

(87) PCT Pub. No.: WO2016/181920
PCT Pub. Date: Nov. 17, 2016

(65) Prior Publication Data
US 2018/0142123 A1 May 24, 2018

(30) Foreign Application Priority Data

May 8, 2015 (JP) .................. 2015-095607
Jan. 28, 2016 (JP) .................. 2016-014382

(51) Int. Cl.
| | | |
|---|---|---|
| C09D 175/04 | (2006.01) | |
| A41C 3/14 | (2006.01) | |
| C08G 18/79 | (2006.01) | |
| C08G 18/62 | (2006.01) | |
| C08G 18/64 | (2006.01) | |
| C08G 18/73 | (2006.01) | |
| C08G 18/78 | (2006.01) | |
| C08G 18/10 | (2006.01) | |
| C08G 18/16 | (2006.01) | |
| C08G 18/18 | (2006.01) | |
| C08G 18/24 | (2006.01) | |
| C08G 18/28 | (2006.01) | |
| C08G 18/32 | (2006.01) | |
| C08G 18/48 | (2006.01) | |
| G01N 30/00 | (2006.01) | |
| C08G 101/00 | (2006.01) | |

(52) U.S. Cl.
CPC .............. *C09D 175/04* (2013.01); *A41C 3/14* (2013.01); *C08G 18/10* (2013.01); *C08G 18/168* (2013.01); *C08G 18/1833* (2013.01); *C08G 18/1875* (2013.01); *C08G 18/244* (2013.01); *C08G 18/246* (2013.01); *C08G 18/282* (2013.01); *C08G 18/3206* (2013.01); *C08G 18/4829* (2013.01); *C08G 18/6229* (2013.01); *C08G 18/6415* (2013.01); *C08G 18/73* (2013.01); *C08G 18/7837* (2013.01); *C08G 18/79* (2013.01); *C08G 18/791* (2013.01); *C08G 18/798* (2013.01); *C08G 2101/005* (2013.01); *C08G 2101/0008* (2013.01); *C08G 2101/0083* (2013.01); *G01N 2030/486* (2013.01)

(58) Field of Classification Search
CPC .. C09D 175/06; C09D 175/04; C08G 18/244; C08G 18/1833; C08G 18/4829; C08G 18/6415; C08G 18/791; C08G 18/10; C08G 18/798; C08G 18/168; C08G 18/1875; C08G 18/6229; C08G 18/246; C08G 18/73; C08G 18/7837; C08G 18/3206; C08G 18/282; C08G 18/79; C08G 2101/005; C08G 2101/0008; C08G 2101/0083; A41C 3/14; G01N 2030/486
See application file for complete search history.

(56) References Cited

U.S. PATENT DOCUMENTS

| | | |
|---|---|---|
| 2009/0131603 A1 | 5/2009 | Asahina |
| 2013/0079486 A1 | 3/2013 | Hidesaki et al. |
| 2013/0338330 A1 | 12/2013 | Sato |
| 2014/0107243 A1 | 4/2014 | Niesten et al. |
| 2014/0343280 A1 | 11/2014 | Richter |
| 2017/0015776 A1 | 1/2017 | Tsukada et al. |
| 2018/0142056 A1 | 5/2018 | Matner |
| 2018/0142123 A1 | 5/2018 | Nakagawa |

FOREIGN PATENT DOCUMENTS

| | | |
|---|---|---|
| CA | 2312462 | 12/2000 |
| JP | 09104738 | 4/1997 |
| JP | 2001026632 A1 | 1/2001 |
| JP | 3142230 | 3/2001 |
| JP | 2007112936 A2 | 5/2007 |
| JP | 2007332193 A2 | 12/2007 |
| JP | 2010265364 A | 11/2010 |
| JP | 2011201863 A2 | 10/2011 |
| JP | 2013224350 A2 | 10/2013 |
| JP | 2013245341 A2 | 12/2013 |
| JP | 2015500900 A | 1/2015 |
| JP | 2018513900 A | 5/2018 |
| WO | 2007046470 A1 | 4/2007 |
| WO | 2012121291 A1 | 9/2012 |
| WO | 2015137401 A1 | 9/2015 |
| WO | 2016181920 A1 | 11/2016 |

OTHER PUBLICATIONS

International Search Report dated Aug. 9, 2016 filed in PCT/JP2016/063699.

(Continued)

*Primary Examiner* — Rabon A Sergent
(74) *Attorney, Agent, or Firm* — Rankin, Hill & Clark LLP

(57) ABSTRACT

A polyisocyanate composition includes at least a pentamethylenediisocyanate derivative. The polyisocyanate composition contains 5 mass % or more and 95 mass % or less of a uretdione derivative composed of an isocyanate bimolecular-product of pentamethylenediisocyanate.

7 Claims, 3 Drawing Sheets

(56) References Cited

OTHER PUBLICATIONS

Extended European Search Report (EESR) dated Nov. 27, 2018 issued in the corresponding European patent application No. 16792645.0.
Extended European Search Report (EESR) dated Nov. 27, 2018 issued in the corresponding European patent application No. 16792646.8.
International Preliminary Report on Patentability dated Nov. 23, 2017 filed in PCT/JP2016/063699, total 10 pages.

POLYISOCYANATE COMPOSITION, POLYURETHANE RESIN, AND COATING

TECHNICAL FIELD

The present invention relates to a polyisocyanate composition, polyurethane resin composed of the polyisocyanate composition, and a coating including the polyurethane resin.

BACKGROUND ART

It has been known that when producing polyurethane resin, use of polyisocyanate derived from hexamethylenediisocyanate allows for production of polyurethane resin with excellent weatherability.

For such polyisocyanate, for example, Patent Document 1 has proposed a polyisocyanate composition derived from a hexamethylenediisocyanate monomer and isobutanol, having an isocyanurate trimer concentration of 60 mass % under conditions where hexamethylenediisocyanate monomer and a solvent are not included, having 1% or more and less than 5% of a ratio of the number of the allophanate group/isocyanurate group derived from isobutanol, having a uretdione dimer concentration of 12 mass %, and having a viscosity at 25° C. of 620 mPa·s (for example, see Example 1).

CITATION LIST

Patent Document

Patent Document 1: Japanese Unexamined Patent Publication No. 2007-112936

SUMMARY OF THE INVENTION

Problem to be Solved by the Invention

However, the polyurethane resin obtained from the polyisocyanate composition of Patent Document 1 has insufficient hardness and chemical resistance depending on the industrial fields to which it is applied.

Furthermore, examination by the present inventors has revealed that, for example, in usage for a coating, there is a trade-off relationship between hardness and surface smoothness, and it is necessary to achieve sufficient surface smoothness even with improvement in hardness.

Thus, an object of the present invention is to provide a polyisocyanate composition that allows for production of polyurethane resin with improved hardness and chemical resistance, and for well-balanced improvement in hardness, chemical resistance, and surface smoothness.

Means for Solving the Problem

The present invention [1] includes a polyisocyanate composition including at least a pentamethylenediisocyanate derivative, wherein 5 mass % or more and 95 mass % or less of a uretdione derivative composed of an isocyanate bimolecular-product of pentamethylenediisocyanate is contained.

The present invention [2] includes the polyisocyanate composition of [1] above, containing 10 mass % or more and 95 mass % or less of the uretdione derivative composed of the isocyanate bimolecular-product of pentamethylenediisocyanate.

The present invention [3] includes the polyisocyanate composition of [1] or [2] above, wherein in a chromatogram of the polyisocyanate composition in gel permeation chromatograph measurement, the ratio of the peak area having a peak top between 280 to 490 of polyethylene glycol-based molecular weight relative to a total peak area is 50% or more and 80% or less.

The present invention [4] includes the polyisocyanate composition of any one of [1] to [3] above, containing 3 mass % or more and 20 mass % or less of an isocyanate quadmolecular-product of pentamethylenediisocyanate.

The present invention [5] includes the polyisocyanate composition of any one of [1] to [4] above, containing 10 mass % or more and 55 mass % or less of an isocyanate trimolecular-product of pentamethylenediisocyanate.

The present invention [6] includes polyurethane resin of a reaction product of the polyisocyanate composition of any one of [1] to [5] and an active hydrogen group-containing compound.

The present invention [7] includes a method for producing polyurethane resin, the method including allowing the polyisocyanate composition of any one of [1] to [5] to react with an active hydrogen group-containing compound.

The present invention [8] includes a coating including the polyurethane resin of [6] above.

Effects of the Invention

The polyisocyanate composition of the present invention includes at least a pentamethylenediisocyanate derivative, wherein 5 mass % or more and 95 mass % or less of a uretdione derivative composed of an isocyanate bimolecular-product of pentamethylenediisocyanate is contained.

Therefore, the polyurethane resin produced from the polyisocyanate composition and the coating containing the polyurethane resin allows for improvement in hardness and chemical resistance, and for improvement in hardness, chemical resistance, and surface smoothness in well-balanced manner.

DESCRIPTION OF EMBODIMENTS

Figure 1:
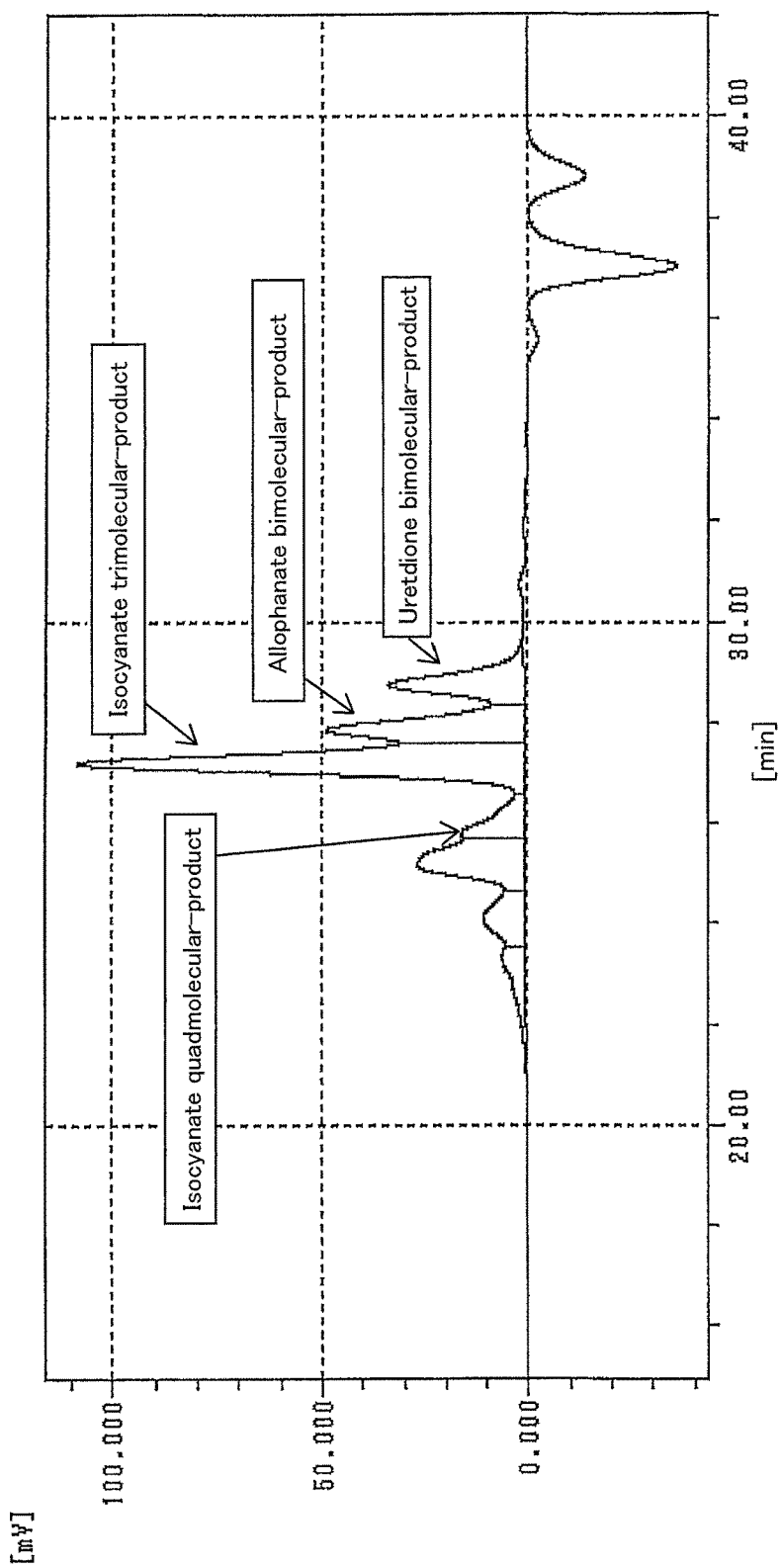
FIG. 1 is a chromatogram of gel permeation chromatograph measurement of the polyisocyanate composition of Example 2.

The polyisocyanate composition of the present invention contains at least a pentamethylenediisocyanate derivative, and preferably, the polyisocyanate composition of the present invention consists essentially of the pentamethylenediisocyanate derivative. In the polyisocyanate composition of the present invention, essentially means that impurities other than the pentamethylenediisocyanate derivative are 1.0 mass % or less relative to a total amount of the polyisocyanate composition.

Examples of the pentamethylenediisocyanate include, for example, 1,2-pentamethylenediisocyanate, 1,3-pentamethylenediisocyanate, 1,4-pentamethylenediisocyanate, 1,5-pentamethylenediisocyanate, 2,3-pentamethylenediisocyanate, 2,4-pentamethylenediisocyanate, and a mixture thereof. Preferably, 1,5-pentamethylenediisocyanate is used.

In the following, in the present invention, pentamethylenediisocyanate (hereinafter may be referred to as PDI) is 1,5-pentamethylenediisocyanate unless otherwise noted.

The pentamethylenediisocyanate is not particularly limited, and for example, it can be produced in accordance with Example 1 of DESCRIPTION of WO 2012/121291.

The polyisocyanate composition of the present invention contains, as an essential component, a uretdione derivative of pentamethylenediisocyanate, and may contain, as optional components, for example, an isocyanurate derivative and an allophanate derivative of pentamethylenediisocyanate.

Examples of the uretdione derivative of pentamethylenediisocyanate include uretdione multimolecular-product of pentamethylenediisocyanate such as, for example, uretdione bimolecular-product (to be specific, a compound in which two isocyanate groups at one end of two pentamethylenediisocyanates form one uretdione ring, and the other two isocyanate groups of the pentamethylenediisocyanates remain (pentamethylenediisocyanate bimolecular-product having one uretdione ring)), uretdione trimolecular-product (to be specific, pentamethylenediisocyanate trimolecular-product having two uretdione rings), uretdione quadmolecular-product (to be specific, pentamethylenediisocyanate quadmolecular-product having three uretdione rings), uretdione pentamolecular-product (to be specific, pentamethylenediisocyanate pentamolecular-product having four uretdione rings), . . . , and uretdione n-molecular-product (to be specific, pentamethylenediisocyanate n-molecular-product having (n−1) uretdione ring)) of pentamethylenediisocyanate, and preferably includes uretdione bimolecular-product, uretdione trimolecular-product, and uretdione quadmolecular-product of pentamethylenediisocyanate.

Examples of the isocyanurate derivative of pentamethylenediisocyanate include isocyanurate multimolecular-product of pentamethylenediisocyanate such as, for example, isocyanurate trimolecular-product (to be specific, a compound in which three isocyanate groups at one end of three pentamethylenediisocyanates form one isocyanurate ring, and the other three isocyanate groups of the pentamethylenediisocyanates remain (pentamethylenediisocyanate trimolecular-product having one isocyanurate ring)), isocyanurate pentamolecular-product (to be specific, pentamethylenediisocyanate pentamolecular-product having two isocyanurate rings), . . . , and isocyanurate n-molecular-product (pentamethylenediisocyanate having n-molecular-product ((n−1)/2) isocyanurate ring) of pentamethylenediisocyanate, and preferably includes isocyanurate trimolecular-product of pentamethylenediisocyanate.

Examples of the allophanate derivative of pentamethylenediisocyanate include allophanate multimolecular-product of pentamethylenediisocyanate such as, for example, allophanate bimolecular-product (to be specific, a compound in which an allophanate group is formed by reaction of a urethane group, which is formed by reaction between one isocyanate group of one pentamethylenediisocyanate and a hydroxy group of monohydric alcohol (described later), with one isocyanate group of another pentamethylenediisocyanate, and other two isocyanate groups remain (pentamethylenediisocyanate bimolecular-product having one allophanate group)), allophanate quadmolecular-product (to be specific, a compound in which two allophanate groups are formed by reaction of two urethane groups, which are formed by reaction between two isocyanate groups at one end of two pentamethylenediisocyanates and two hydroxy groups of dihydric alcohol (described later), with two isocyanate groups at one end of other two pentamethylenediisocyanates, and other four isocyanate groups remain (pentamethylenediisocyanate quadmolecular-product having two allophanate groups)), and allophanate of pentamethylenediisocyanate obtained by further allowing the above-described allophanate bimolecular-product or allophanate quadmolecular-product to react with pentamethylenediisocyanate and/or alcohol, and preferably include allophanate bimolecular-product and quadmolecular-product of pentamethylenediisocyanate, more preferably include allophanate bimolecular-product of pentamethylenediisocyanate.

The polyisocyanate composition of the present invention contains, as an essential component, a uretdione derivative composed of isocyanate bimolecular-product of pentamethylenediisocyanate (in the following, referred to as uretdione bimolecular-product), and preferably contains, as an optional component, isocyanate trimolecular-product (mainly contains isocyanurate trimolecular-product and uretdione trimolecular-product, also may include iminooxadiazinedione trimolecular-product (structural isomers of isocyanurate trimolecular-product)) and isocyanate quadmolecular-product (mainly contains uretdione quadmolecular-product and allophanate quadmolecular-product) of pentamethylenediisocyanate. More preferably, as an optional component, isocyanate trimolecular-product, isocyanate quadmolecular-product, and allophanate bimolecular-product of pentamethylenediisocyanate are contained.

The derivative content of pentamethylenediisocyanate relative to a total amount of the polyisocyanate composition can be determined by gel permeation chromatography (GPC) in accordance with Examples to be described later.

To be specific, the polyisocyanate composition is subjected to measurement with gel permeation chromatograph equipped with a refractive index detector (RID), and in the chromatogram, the ratio of the peak area having a polyethylene glycol-based molecular weight peak top in a specific range relative to a total peak area corresponds to the derivative content of pentamethylenediisocyanate (mass-based).

The derivative having a polyethylene glycol-based molecular weight peak top in a specific range measured with a chromatogram of gel permeation chromatograph is identified with 1H-NMR method or 13C-NMR method, after separating the derivative of each peak in fraction gel permeation chromatograph.

The pentamethylenediisocyanate uretdione bimolecular-product content corresponds to, in a chromatogram of the polyisocyanate composition subjected to gel permeation chromatograph measurement, an area ratio of a peak area having a peak top between 280 or more and 350 or less, preferably 290 or more and 330 or less of polyethylene glycol-based molecular weight relative to a total peak area.

The pentamethylenediisocyanate uretdione bimolecular-product content relative to a total amount of the polyisocyanate composition is, 5 mass % or more and 95 mass % or less, preferably 60 mass % or less, more preferably 50 mass % or less, further preferably 40 mass % or less, even more preferably 30 mass % or less, even more preferably 20 mass % or less, even more preferably 10 mass % or less, and particularly preferably 7 mass % or less.

When the pentamethylenediisocyanate uretdione bimolecular-product content is within the above-described range, a polyisocyanate composition that allows for improvement in hardness and chemical resistance of polyurethane resin (described later) can be produced.

In view of smoothness of polyurethane resin (described later), pentamethylenediisocyanate uretdione bimolecular-product content relative to a total amount of the polyisocyanate composition is, for example, 5 mass % or more, preferably 10 mass % or more, more preferably 20 mass % or more, even more preferably 29 mass % or more, even more preferably 50 mass % or more, even more preferably 60 mass % or more, and particularly preferably 80 mass % or more, and for example, 95 mass % or less.

The pentamethylenediisocyanate allophanate bimolecular-product content corresponds to the ratio of a peak area having a peak top between more than 350 and 410 or less, preferably 360 or more and 400 or less of the polyethylene glycol-based molecular weight relative to a total peak area in a chromatogram of the polyisocyanate composition subjected to gel permeation chromatograph measurement.

The pentamethylenediisocyanate allophanate bimolecular-product content relative to a total amount of the polyisocyanate composition is, for example, 1 mass % or more, preferably 5 mass % or more, more preferably 15 mass % or more, and for example, 50 mass % or less, preferably 30 mass % or less, more preferably 20 mass % or less.

When the pentamethylenediisocyanate allophanate bimolecular-product content is within the above-described range, a polyisocyanate composition that allows for improvement in bending resistance and elongation at break in tensile test of polyurethane resin to be produced (described later) can be produced.

The isocyanate trimolecular-product of pentamethylenediisocyanate content corresponds to the ratio of a peak area having a peak top between more than 410 and 490 or less, preferably 430 or more and 480 or less of the polyethylene glycol-based molecular weight relative to a total peak area in a chromatogram of the polyisocyanate composition subjected to gel permeation chromatograph measurement. The isocyanate trimolecular-product of pentamethylenediisocyanate content corresponds to, mainly, a total amount of the pentamethylenediisocyanate isocyanurate trimolecular-product content and the pentamethylenediisocyanate uretdione trimolecular-product content.

The isocyanate trimolecular-product of pentamethylenediisocyanate content relative to a total amount of the polyisocyanate composition is, for example, 1 mass % or more, preferably 10 mass % or more, more preferably 20 mass % or more, even more preferably 30 mass % or more, even more preferably 35 mass % or more, even more preferably 40 mass % or more, particularly preferably 42 mass % or more, and for example, 55 mass % or less, preferably 45 mass % or less.

When the isocyanate trimolecular-product of pentamethylenediisocyanate content is within the above-described range, a polyisocyanate composition that allows for improvement in hardness and chemical resistance of polyurethane resin to be produced (described later) can be produced.

The pentamethylenediisocyanate isocyanate quadmolecular-product content corresponds to, in a chromatogram of the polyisocyanate composition subjected to gel permeation chromatograph measurement, a ratio of a peak area having a peak top between 580 or more and 730 or less, preferably 590 or more and 720 or less of polyethylene glycol-based molecular weight relative to a total peak area. The pentamethylenediisocyanate isocyanate quadmolecular-product content corresponds to a total amount of the pentamethylenediisocyanate uretdione quadmolecular-product content and the pentamethylenediisocyanate allophanate quadmolecular-product content.

The pentamethylenediisocyanate quadmolecular-product content relative to a total amount of the polyisocyanate composition is, for example, 1 mass % or more, preferably 3 mass % or more, and for example, 20 mass % or less, preferably 15 mass % or less, more preferably, 10 mass % or less, even more preferably 6 mass % or less.

When the pentamethylenediisocyanate isocyanate quadmolecular-product content is within the above-described range, a polyisocyanate composition that allows for improvement in hardness and chemical resistance of polyurethane resin to be produced (described later) can be produced.

In view of balance between smoothness, hardness, and chemical resistance of polyurethane resin (described later), the pentamethylenediisocyanate quadmolecular-product content relative to a total amount of the polyisocyanate composition is, for example, 1 mass % or more, preferably 3 mass % or more, more preferably 6 mass % or more, even more preferably 10 mass % or more, particularly preferably 15 mass % or more, and for example, 20 mass % or less.

In the present invention, in a chromatogram of the polyisocyanate composition in gel permeation chromatograph measurement, the ratio of a peak area having a peak top between 280 or more and 490 or less, preferably 290 or more and 480 or less of the polyethylene glycol-based molecular weight relative to a total peak area (in the following, referred to as bimolecular-product and trimolecular-product area ratio) is, for example, 40 mass % or more, preferably 50 mass % or more, more preferably, 60 mass % or more, and for example, 80 mass % or less, preferably 70 mass % or less, more preferably 65 mass % or less.

The area ratio of the pentamethylenediisocyanate bimolecular-product and trimolecular-product mainly corresponds to a total amount of pentamethylenediisocyanate uretdione bimolecular-product, allophanate bimolecular-product, and isocyanate trimolecular-product (isocyanurate trimolecular-product and uretdione trimolecular-product) contents.

When the bimolecular-product and trimolecular-product area ratio is within the above-described range, a polyisocyanate composition that allows for production of polyurethane resin (described later) having well-balanced smoothness, hardness, and chemical resistance can be produced.

In a chromatogram of the polyisocyanate composition subjected to gel permeation chromatograph measurement, the peak top of the polyethylene glycol-based molecular weight corresponding to the peak top of the isocyanate quadmolecular-product or more corresponds to the derivative with high-molecular weight of isocyanurate pentamolecular-product, uretdione pentamolecular-product or more.

The ratio (uretdione bimolecular-product/isocyanate trimolecular-product) of the pentamethylenediisocyanate uretdione bimolecular-product relative to the isocyanate trimolecular-product of pentamethylenediisocyanate can be calculated based on their area ratios as described above, and for example, the ratio is 0.10 or more, preferably 0.20 or more, more preferably 0.30 or more, even more preferably 0.80 or more, and for example, 10 or less, preferably 3.00 or less, more preferably 2.00 or less, even more preferably 1.50 or less, particularly preferably 1.00 or less.

When the above-described ratio of the pentamethylenediisocyanate uretdione bimolecular-product to the pentamethylenediisocyanate-trimolecular-product is within the above-described range, a polyisocyanate composition that allows for production of polyurethane resin (described later) having well-balanced smoothness, hardness, and chemical resistance can be produced.

The polyisocyanate composition has a pentamethylenediisocyanate (pentamethylenediisocyanate monomer) concentration (measured in accordance with Examples to be described later) relative to a total amount of the polyisocyanate composition of, generally less than the detection limit, and when it has a pentamethylenediisocyanate (pentamethylenediisocyanate monomer) concentration of the detection limit or more, the pentamethylenediisocyanate (pentamethylenediisocyanate monomer) concentration is, for example, 0.1 mass % or more, and for example, 1.0 mass % or less, preferably 0.5 mass % or less, more preferably 0.2 mass % or less.

The polyisocyanate composition has an isocyanate group content (measured in accordance with Examples to be described later) relative to a total amount of the polyisocyanate composition of, 20.0 mass % or more, preferably 22.0 mass % or more, more preferably, 23.0 mass % or more, even more preferably 24.0 mass % or more, and for example, 27.0 mass % or less, preferably 26.0 mass % or less, more preferably, 25.0 mass % or less, even more preferably 24.5 mass % or less.

In the polyisocyanate composition, the average functionality of the isocyanate group is, for example, 1.8 or more, preferably 2.0 or more, and for example, 4.0 or less, preferably 3.0 or less.

The polyisocyanate composition has a viscosity at 25° C. (measured in accordance with Examples to be described later) of, for example, 23 mPa·s or more, preferably 70 mPa·s or more, more preferably 100 mPa·s or more, and for example, 2000 mPa·s or less, preferably 1500 mPa·s or less, more preferably 1200 mPa·s or less, even more preferably 1000 mPa·s or less, even more preferably 600 mPa·s or less, even more preferably 400 mPa·s or less, even more preferably 300 mPa·s or less, even more preferably 200 mPa·s or less, particularly preferably 180 mPa·s or less.

When the polyisocyanate composition has a viscosity within the above-described range, smoothness of the polyurethane resin to be produced (described later) can be improved.

Next, a method for producing a polyisocyanate composition of the present invention is described.

To produce the polyisocyanate composition of the present invention, inactive gas such as nitrogen is introduced into pentamethylenediisocyanate, and after allowing the atmosphere to be an inactive gas atmosphere, reaction is caused to form a derivative.

To produce a polyisocyanate composition (containing a small amount of, or not containing a derivative other than the uretdione derivative) containing a uretdione derivative of pentamethylenediisocyanate as an essential component, pentamethylenediisocyanate is heated in an inactive gas atmosphere to cause uretdione-formation reaction.

To be specific, to produce a polyisocyanate composition (to be specific, a polyisocyanate composition containing 80% or more of the uretdione derivative (in particular, uretdione bimolecular-product)) containing uretdione derivative of pentamethylenediisocyanate (in particular, uretdione bimolecular-product) in a larger amount relative to other derivatives, for example, the following conditions are applied: under atmosphere of inactive gas such as nitrogen gas and normal pressure (atmospheric pressure), reaction temperature of, for example, 100° C. or more, preferably 130° C. or more, and for example, 200° C. or less, preferably 170° C. or less, the reaction time of, for example, 0.5 hours or more, preferably 3 hours or more, and for example, 20 hours or less, preferably 15 hours or less.

In the above reaction, as necessary, a known uretdione-formation catalyst can be blended.

Examples of the uretdione-formation catalyst include trivalent phosphorus compounds such as triethylphosphine, tri-n-propylphosphine, triisopropylphosphine, tri-n-butyl- phosphine, triisobutylphosphine, tritertiarybutylphosphine, tri-n-hexylphosphine, tricyclohexylphosphine, tri-n-octylphosphine, tribenzylphosphine, and benzyldimethylphosphine, and Lewis acids such as boron trifluoride and zinc trichloride.

The uretdione-formation catalyst can be used singly, or can be used in combination of two or more.

When the uretdione-formation catalyst is blended, for example, 1 ppm or more, preferably 10 ppm or more, generally 1000 ppm or less, preferably 500 ppm or less of the catalyst is blended relative to pentamethylenediisocyanate, based on mass.

When the uretdione-formation catalyst is blended, the reaction temperature is, for example, 25° C. or more, preferably 40° C. or more, more preferably, 60° C. or more, and for example, 120° C. or less, preferably 100° C. or less.

In this manner, a reaction mixture containing the uretdione derivative of pentamethylenediisocyanate in a larger amount relative to other derivative can be produced.

In the derivative-formation reaction, to produce a polyisocyanate composition containing isocyanurate derivative and uretdione derivative of pentamethylenediisocyanate, pentamethylenediisocyanate is subjected to isocyanurate-formation reaction and uretdione-formation reaction.

Upon producing the polyisocyanate composition containing isocyanurate derivative and uretdione derivative of pentamethylenediisocyanate, to produce a polyisocyanate composition containing 20 mass % or less of the uretdione derivative relative to a total amount of the polyisocyanate composition (to be specific, the ratio of the uretdione derivative (in particular, uretdione bimolecular-product) relative to the isocyanurate derivative (in particular, isocyanate trimolecular-product) is 0.6 or less), pentamethylenediisocyanate is first subjected to isocyanurate-formation reaction, and thereafter, subjected to uretdione-formation reaction.

To cause isocyanurate-formation reaction, adding an isocyanurate-formation catalyst and heating will suffice, but going through urethane-forming reaction allows formation of an isocyanurate ring easily, and therefore preferably alcohol is blended to subject pentamethylenediisocyanate and alcohol to urethane-forming reaction.

Examples of the alcohol include monohydric alcohol and dihydric alcohol.

Examples of the monohydric alcohol include straight chain monohydric alcohol and branched monohydric alcohol.

Examples of the straight chain monohydric alcohol include C (number of carbon, the same applies in the following) 1 to 20 straight chain monohydric alcohol such as methanol, ethanol, n-propanol, n-butanol, n-pentanol, n-hexanol, n-heptanol, n-octanol, n-nonanol, n-decanol, n-undecanol, n-dodecanol (laurylalcohol), n-tridecanol, n-tetradecanol, n-pentadecanol, n-hexadecanol, n-heptadecanol, n-octadecanol (stearyl alcohol), n-nonadecanol, and eicosanol.

Examples of the branched monohydric alcohol include C3 to 20 branched monohydric alcohols such as isopropanol, isobutanol (isobutylalcohol), sec-butanol, tert-butanol, isopentanol, isohexanol, isoheptanol, isooctanol, 2-ethylhexane-1-ol, isononanol, isodecanol, 5-ethyl-2-nonanol, trimethylnonylalcohol, 2-hexyldecanol, 3,9-diethyl-6-tridecanol, 2-isoheptyl isoundecanol, 2-octyldodecanol, and other branched alkanol (C5 to 20).

Examples of the dihydric alcohol include C2 to 20 dihydric alcohols such as straight chain dihydric alcohol including ethylene glycol, 1,3-propanediol, 1,4-butanediol (1,4-butyleneglycol), 1,5-pentanediol, 1,6-hexanediol, 1,4- dihydroxy-2-butene, diethylene glycol, triethylene glycol, dipropylene glycol, and other straight chain alkane (C7 to 20) diols; branched dihydric alcohols including 1,2-propanediol, 1,3-butanediol (1,3-butyleneglycol), 1,2-butanediol (1,2-butyleneglycol), neopentyl glycol, 3-methyl-1,5-pentanediol, 2,2,2-trimethylpentanediol, 3,3-dimethylolheptane, 2,6-dimethyl-1-octene-3,8-diol, and other branched alkane (C7 to 20) diols; 1,3- or 1,4-cyclohexanedimethanol and a mixture thereof, 1,3- or 1,4-cyclohexanediol and a mixture thereof, hydrogenated bisphenol A, and bisphenol A.

For alcohol, a compound having both a hydrophilic group and an active hydrogen group to be described later (in the following, referred to as hydrophilic group-containing active hydrogen compound) can also be used.

These alcohols can be used singly, or can be used in combination of two or more.

For the alcohol, preferably, C1 to 20 straight chain monohydric alcohol, C3 to 20 branched monohydric alcohol are used. Even more preferably, C3 to 20 branched monohydric alcohol is used, and particularly preferably, isobutylalcohol is used.

In this reaction, alcohol is blended, and therefore to be described later, except for the case where the allophanate derivative is produced intentionally, a small amount of allophanate derivative is by-produced and remains relative to the isocyanurate derivative.

When the allophanate derivative is not produced intentionally, alcohol is blended relative to 100 parts by mass of pentamethylenediisocyanate, in an amount of, for example, 0.01 parts by mass or more, preferably 0.05 parts by mass or more, and for example, 1.0 part by mass or less, preferably 0.8 parts by mass or less.

When the allophanate derivative is not produced intentionally, the allophanate derivative content relative to a total amount of the polyisocyanate composition is, for example, 0.1 mass % or more, and for example, 10 mass % or less, preferably 5 mass % or less.

The urethane-forming reaction conditions are as follows: for example, under atmosphere of inactive gas such as nitrogen gas and normal pressure (atmospheric pressure), reaction temperature of, for example, room temperature (for example, 25° C.) or more, preferably 40° C. or more, for example, 100° C. or less, preferably 90° C. or less. The reaction time is, for example, 0.5 hours or more, preferably 1 hour or more, and for example, 10 hours or less, preferably 6 hours or less, more preferably, 3 hours or less.

In the urethane-forming reaction described above, a known urethane-forming catalyst (for example, amines, organic metal compound, etc) can be blended.

In this manner, pentamethylenediisocyanate that went through urethane-formation can be produced.

To cause isocyanurate-formation reaction, then, pentamethylenediisocyanate that went through urethane-formation and pentamethylenediisocyanate are subjected to isocyanurate ring-formation reaction in the presence of a derivative-formation catalyst (isocyanurate-formation catalyst) that accelerates isocyanurate formation.

Examples of the isocyanurate-formation catalyst include hydroxide of tetraalkylammonium such as tetramethylammonium, tetraethylammonium, tetrabutylammonium, trimethylbenzylammonium, and tributylbenzylammonium or their organic salt of weak acid; hydroxide of trialkylhydroxyalkylammonium such as trimethylhydroxypropylammonium (also called: N-(2-hydroxypropyl)-N,N,N-trimethylammonium), trimethylhydroxyethylammonium, triethylhydroxypropylammonium, and triethylhydroxyethylammonium or their organic salt of weak acid (for example, N-(2-hydroxypropyl)-N,N,N-trimethylammonium-2-ethylhexanoate, etc); metal salt (for example, alkali metal salt, magnesium salt, tin salt, zinc salt, lead salt, etc) of alkylcarboxylic acid such as acetic acid, caproic acid, octylic acid, myristic acid, and naphthenic acid; metal chelate compounds of β-diketone such as aluminum acetylacetone and lithium acetylacetone; Friedel-Crafts catalysts such as aluminum chloride and boron trifluoride; various organic metal compounds such as titaniumtetrabutyrate and tributylantimonyoxide; and aminosilyl group-containing compounds such as hexamethylsilazane.

These isocyanurate-formation catalysts can be used singly, or can be used in combination of two or more.

These isocyanurate-formation catalysts accelerate isocyanurate formation, but do not accelerate uretdione formation.

For the isocyanurate-formation catalyst, preferably, organic salt of weak acid of trialkylhydroxyalkylammonium is used, more preferably, N-(2-hydroxypropyl)-N,N,N-trimethylammonium-2-ethylhexanoate is used.

The isocyanurate-formation catalyst (based on active component 100%) is blended in an amount relative to 100 parts by mass of pentamethylenediisocyanate of, for example, 0.002 parts by mass or more, preferably 0.005 parts by mass or more, and for example, 0.1 parts by mass or less, preferably 0.05 parts by mass or less.

In the isocyanurate ring-formation reaction, reaction conditions are as follows: for example, under atmosphere of inactive gas such as nitrogen gas and normal pressure (atmospheric pressure), reaction temperature of, for example, 50° C. or more, preferably 70° C. or more, more preferably 80° C. or more, and for example, 120° C. or less, preferably 100° C. or less. The reaction time is, for example, 10 minutes or more, preferably 20 minutes or more, and for example, 120 minutes or less, preferably 60 minutes or less.

In the isocyanurate ring-formation reaction, at the point when the reaction rate of the isocyanate group (the reaction rate of the isocyanate group and the urethane group relative to a total amount of the isocyanate group and the urethane group when the isocyanate group and the urethane group of the pentamethylenediisocyanate after completion of the urethane-forming reaction are allowed to react and converted to the uretdione group, isocyanurate group, and allophanate group) or conversion rate of the isocyanate group (the reaction rate of the isocyanate group relative to a total amount of the isocyanate group when the isocyanate group of the pentamethylenediisocyanate is allowed to react and converted to the uretdione group, isocyanurate group, urethane group, and allophanate group) reaches a predetermined ratio to be described later, for example, a reaction terminator such as phosphoric acid, monochloroacetic acid, benzoyl chloride, dodecylbenzenesulfonic acid, toluenesulfonic acid (o- or p-toluenesulfonic acid) and a derivative thereof (for example, o- or p-toluenesulfonic acid methyl, etc), and toluenesulfonamide (o- or p-toluenesulfonamide) is added to the reaction liquid to deactivate the catalyst and to terminate the isocyanurate-formation reaction. In this case, the isocyanurate-formation reaction can also be terminated by adding an adsorbent that adsorbs catalysts such as chelate resin and ion-exchange resin.

The reaction rate of the isocyanate group is, for example, 5 mass % or more, preferably 10 mass % or more, and for example, 35 mass % or less, preferably 25 mass % or less.

When the reaction rate of the isocyanate group is more than the above-described range, the produced isocyanurate derivative of pentamethylenediisocyanate further goes through reaction, which may reduce solubility, compatibility, and the isocyanate group concentration, and may increase viscosity. The reaction rate of the isocyanate group can be measured by, for example, titrimetry such as the one in Examples to be described later.

The isocyanate group conversion rate relative to a total amount of the polyisocyanate composition is, for example, 10 mass % or more, preferably 20 mass % or more, more preferably 25 mass % or more, even more preferably 35 mass % or more, and for example, 70 mass % or less, preferably 50 mass % or less.

The isocyanate group conversion rate can be measured by a method, for example, such as the one using GPC a device, as in Examples to be described later.

In this manner, pentamethylenediisocyanate can be subjected to isocyanurate-formation reaction.

Thereafter, the reaction liquid produced by the isocyanurate-formation reaction is subjected to heat treatment, thereby subjecting the reaction liquid to uretdione-formation reaction.

The heat treatment conditions are the same as those in the above-described uretdione-formation reaction, and to be specific, the heat treatment temperature is, for example, 100° C. to 200° C., preferably 150° C. to 170° C., and the heat treatment time is, 0.5 hours to 5 hours, 1 hour to 3 hours.

In this manner, the uretdione-formation reaction can be performed, and as a result, a reaction mixture containing an isocyanurate derivative and a uretdione derivative, and containing 20 mass % or less of the uretdione derivative relative to the isocyanurate derivative can be produced.

Upon producing the polyisocyanate composition containing isocyanurate derivative and uretdione derivative of pentamethylenediisocyanate, when producing a polyisocyanate composition (to be specific, more than 0.6 of uretdione derivative (in particular, uretdione bimolecular-product) relative to isocyanurate derivative (in particular, isocyanate trimolecular-product)) containing more than 20 mass % of the uretdione derivative relative to a total amount of the polyisocyanate composition, the isocyanurate-formation reaction and uretdione-formation reaction of the pentamethylenediisocyanate are performed simultaneously.

To perform the isocyanurate-formation reaction and uretdione-formation reaction simultaneously, first, in the same manner as described above, pentamethylenediisocyanate and alcohol are subjected to urethane-forming reaction.

In this reaction, the alcohol blended is, for example, in view of accelerating the isocyanurate ring-formation reaction by alcohols and catalysts, preferably dihydric alcohol, more preferably, 1,3-propanediol (1,3-PG), 1,3-butanediol (1,3-BG), 1,4-butanediol (1,4-BG), even more preferably 1,3-butanediol (1,3-BG) is used.

To perform the isocyanurate-formation reaction and the uretdione-formation reaction simultaneously, next, in the presence of a derivative-formation catalyst that can work as both the uretdione-formation catalyst and the isocyanurate-formation catalyst, the pentamethylenediisocyanate that went through urethane-forming reaction and pentamethylenediisocyanate are subjected to isocyanurate ring-formation reaction, and also pentamethylenediisocyanate is subjected to uretdione-formation reaction.

Examples of the derivative-formation catalyst that works as both the uretdione-formation catalyst and the isocyanurate-formation catalyst include, for example, the above-described trivalent phosphorus compound, and preferably tri-n-butylphosphine is used.

These derivative-formation catalysts that work as both the uretdione-formation catalyst and the isocyanurate-formation catalyst accelerate isocyanurate formation as well as uretdione formation. It also may accelerate iminooxadiazinedione-formation.

The derivative-formation catalyst that works as both the uretdione-formation catalyst and the isocyanurate-formation catalyst is blended in an amount of, for example, relative to 100 parts by mass of pentamethylenediisocyanate, for example, 0.1 parts by mass or more, preferably 0.3 parts by mass or more, and for example, 1.0 part by mass or less, preferably 0.5 parts by mass or less.

To perform the isocyanurate-formation reaction and the uretdione-formation reaction simultaneously, the reaction conditions are as follows, for example, under atmosphere of inactive gas such as nitrogen gas and normal pressure (atmospheric pressure), reaction temperature of, for example, 25° C. or more, preferably 40° C. or more, more preferably 60° C. or more, and for example, 100° C. or less, preferably 70° C. or less. The reaction time is, for example, 1 hour or more, preferably 2 hours or more, and for example, 4 hours or less, preferably 3 hours or less.

In the isocyanurate ring-formation reaction and the uretdione-formation reaction, in the same manner as described above, when the reaction rate and the conversion rate of the isocyanate group reaches a predetermined rate, the above-described reaction terminator is added to the reaction liquid to deactivate the catalyst and terminate the reaction.

In this manner, pentamethylenediisocyanate can be subjected to isocyanurate-formation reaction and uretdione-formation reaction, and as a result, a reaction mixture containing isocyanurate derivative and uretdione derivative, and containing more than 20 mass % of the uretdione derivative relative to the isocyanurate derivative can be produced.

Thereafter, the above-described isocyanurate-formation catalyst and/or a known allophanate-formation catalyst are added at, for example, 80 to 120° C., and the temperature is kept for, for example, 1 to 10 hours, which allows for increase in the isocyanurate derivative and/or allophanate derivative contents of the reaction mixture.

In the above-described isocyanurate ring-formation reaction, the allophanate derivative can be produced intentionally.

When the allophanate derivative is produced intentionally, alcohol (in particular, to produce allophanate bimolecular-product intentionally, monohydric alcohol) is blended in an amount relative to 100 parts by mass of pentamethylenediisocyanate, for example, 1.0 part by mass or more, preferably 1.2 parts by mass or more, for example, 5.0 parts by mass or less, preferably 2.0 parts by mass or less.

When the alcohol is blended in an amount within the above-described range when the allophanate derivative is produced intentionally, when in reaction with an active hydrogen group-containing compound (described later), compatibility with the active hydrogen group-containing compound (described later) increases, and pot life of the polyisocyanate composition can be made longer.

To adjust the uretdione formation and isocyanurate ring-formation in the above-described uretdione-formation reaction and isocyanurate-formation reaction, for example, organic phosphite such as the one described in Japanese Unexamined Patent Publication No.Sho 61-129173 can be blended as a promoter.

Examples of the organic phosphite include organic phosphorous acid diester and organic phosphorous acid triester, and to be specific, for example, monophosphites such as triethylphosphite, tributylphosphite, tris (tridecyl) phosphite, triphenylphosphite, tris (nonylphenyl) phosphite, tris (2,4-di-t-butylphenyl) phosphite, and diphenyl (tridecyl) phosphite; and di, tri, or tetraphosphites derived from polyhydric alcohol such as distearyl.penta erythrityl.diphosphite, tripentaerythritol.tiphosphite, and tetraphenyl.dipropylene glycol.diphosphite.

These organic phosphites can be used singly, or can be used in combination of two or more.

For the organic phosphite, preferably, monophosphites are used, more preferably, tris (tridecyl) phosphite is used.

The organic phosphite is blended in an amount of, relative to 100 parts by mass of pentamethylenediisocyanate, for example, 0.01 parts by mass or more, preferably 0.05 parts by mass or more, and for example, 1.0 part by mass or less, preferably 0.1 parts by mass or less.

In the above-described uretdione-formation reaction and isocyanurate ring-formation reaction, as necessary, a reaction stabilizer such as a hindered phenol antioxidant, for example, 2, 6-di (tert-butyl)-4-methylphenol, IRGANOX 1010, IRGANOX 1076, IRGANOX 1135, IRGANOX 245 (all manufactured by BASF Japan, trade name) can be blended.

The reaction stabilizer is blended in an amount of, relative to 100 parts by mass of pentamethylenediisocyanate, for example, 0.01 parts by mass or more, preferably 0.05 parts by mass or more, and for example, 1.0 part by mass or less, preferably 0.1 parts by mass or less.

The above-described promoter and reaction stabilizer can be added at the time of the above-described urethane-forming reaction.

In the above-described derivative-formation reaction, as necessary, a known reaction solvent can be blended.

Then, after termination of reaction, from the reaction mixture obtained, unreacted pentamethylenediisocyanate (when catalyst, reaction solvent and/or catalyst inactivator are blended, including the catalyst, reaction solvent and/or catalyst inactivator) is removed by a known method such as, for example, distillation such as thin-film distillation (Smith distillation) and extraction, thereby producing a polyisocyanate composition.

After removal of the unreacted pentamethylenediisocyanate, the above-described reaction terminator can be added as a stabilizer to the produced polyisocyanate composition in an arbitrary amount.

In this manner, a polyisocyanate composition of the present invention containing a uretdione derivative of pentamethylenediisocyanate as an essential component, and isocyanurate derivative and allophanate derivative of pentamethylenediisocyanate as optional components can be produced.

In the polyisocyanate composition of the present invention, two types or more of the polyisocyanate compositions prepared as described above can be blended.

In the present invention, in the isocyanurate-formation reaction, isocyanurate-formation reaction is caused by blending alcohol, but isocyanurate formation can be caused without blending alcohol.

The polyisocyanate composition of the present invention can be mixed with a uretdione derivative, isocyanurate derivative, and allophanate derivative of aliphatic polyisocyanate (excluding pentamethylenediisocyanate).

For the aliphatic polyisocyanate (excluding pentamethylenediisocyanate), aliphatic diisocyanates such as trimethylenediisocyanate, 1,2-propylenediisocyanate, butylenediisocyanate (tetramethylenediisocyanate, 1,2-butylenediisocyanate, 2,3-butylenediisocyanate, 1,3-butylenediisocyanate), hexamethylenediisocyanate (HDI, for example, 1,6-hexamethylenediisocyanate, etc), 2,4,4- or 2,2,4-trimethylhexamethylenediisocyanate, 2,6-diisocyanatemethyl caproate are used.

These aliphatic polyisocyanates (excluding pentamethylenediisocyanate) can be used singly, or can be used in combination of two or more.

The polyisocyanate composition of the present invention includes at least a pentamethylenediisocyanate derivative, and contains 5 mass % or more and 95 mass % or less of a uretdione derivative composed of isocyanate bimolecular-product of pentamethylenediisocyanate.

Therefore, hardness and chemical resistance of polyurethane resin in which the polyisocyanate composition of the present invention is used can be improved.

The polyisocyanate composition thus produced does not include a solvent, and can be used in a coating, adhesive, and other various industrial use without being diluted with a solvent, but as necessary, it can be dissolved in an organic solvent to be diluted and used.

Examples of the organic solvent include ketones such as acetone, methyl ethyl ketone, methyl isobutyl ketone, and cyclohexanone; nitriles such as acetonitrile; alkyl esters such as methyl acetate, ethyl acetate, butyl acetate, and isobutyl acetate; aliphatic hydrocarbons such as n-hexane, n-heptane, and octane; alicyclic hydrocarbons such as cyclohexane and methylcyclohexane; aromatic hydrocarbons such as toluene, xylene, and ethylbenzene; glycol ether esters such as methyl cellosolve acetate, ethyl cellosolve acetate, methyl carbitol acetate, ethyl carbitol acetate, ethylene glycol ethylether acetate, propylene glycol methylether acetate, 3-methyl-3-methoxybutyl acetate, and ethyl-3-ethoxypropionate; ethers such as diethylether, tetrahydrofuran, and dioxane; halogenated aliphatic hydrocarbons such as methyl chloride, methylene chloride, chloroform, carbon tetrachloride, methyl bromide, methylene iodide, and dichloroethane; polar aprotic solvents such as N-methyl pyrrolidone, dimethylformamide, N,N'-dimethylacetamide, dimethyl sulfoxide, and hexamethyl phosphoramide.

Examples of the organic solvent further include nonpolar solvents (nonpolar organic solvent), and examples of nonpolar solvents include those nonpolar organic solvents having an aniline point of, for example, 10 to 70° C., preferably 12 to 65° C. and having low toxicity and solvency, such as aliphatic, naphthene hydrocarbon organic solvent; and vegetable oils typically represented by turpentine oil.

The nonpolar organic solvents can be obtained from commercially available products, and examples of those commercially available products include petroleum hydrocarbon organic solvents such as Haws (manufactured by Shell Chemicals, aniline point 15° C.), Swasol 310 (manufactured by Maruzen Petrochemical, aniline point 16° C.), Esso Naphtha No. 6 (manufactured by Exxon Mobil Chemical, aniline point 43° C.), Laws (manufactured by Shell Chemicals, aniline point 43° C.), Esso Naphtha No. 5 (manufactured by Exxon Mobil Corporation, aniline point 55° C.), and pegasol 3040 (manufactured by Exxon Mobil Corporation, aniline point 55° C.); and also turpentine oils such as methylcyclohexane (aniline point 40° C.), ethylcyclohexane (aniline point 44° C.), and gum turpentine N (manufactured by YASUHARA CHEMICAL CO., LTD., aniline point 27° C.).

The polyisocyanate composition of the present invention can be mixed with these organic solvents at an arbitrary ratio.

When the polyisocyanate composition of the present invention is diluted with an organic solvent, the polyisocyanate composition concentration relative to a total amount of the liquid mixture in which the polyisocyanate composition is diluted with the organic solvent is, for example, 20 mass % or more, preferably 30 mass % or more, and for example, 95 mass % or less, preferably 90 mass % or less.

In such a case, the viscosity at 25° C. is adjusted to be, for example, 10 mPa·s or more, preferably 20 mPa·s or more, and for example, 10000 mPa·s or less, preferably 5000 mPa·s or less.

To the polyisocyanate composition, as necessary, a known additive, for example, a storage stabilizer (o-toluenesulfonamide, p-toluenesulfonamide, etc), plasticizer, anti-blocking agent, heat-resistant stabilizer, light stabilizer, antioxidant, releasing agent, catalyst, pigment, dye, lubricant, filler, and hydrolysis inhibitor can be further added at a suitable ratio.

Such a polyisocyanate composition is suitably produced by the above-described method for producing a polyisocyanate composition.

The polyisocyanate composition of the present invention can also be used as an aqueous polyisocyanate composition by allowing it to react with a hydrophilic group-containing an active hydrogen compound, preferably used as an aqueous polyisocyanate composition.

The hydrophilic group-containing active hydrogen compound is a compound having both of at least one hydrophilic group and at least one active hydrogen group, and examples of the hydrophilic group include an anionic group (for example, carboxy group (carboxylic acid group), etc), a cationic group, and a nonionic group (for example, polyoxyethylene group, etc). Preferably, a nonionic group is used. The active hydrogen group is a group that reacts with an isocyanate group, and examples thereof include a hydroxyl group, amino group, and epoxy group. When the hydrophilic group-containing active hydrogen compound has both of the hydroxyl group and the amino group, the hydroxyl group is the hydrophilic group and the amino group is the active hydrogen group.

For the hydrophilic group-containing active hydrogen compound, to be more specific, a carboxylic acid group-containing active hydrogen compound, sulfonic acid group-containing active hydrogen compound, hydroxyl group-containing active hydrogen compound, hydrophilic group-containing polybasic acid, and polyoxyethylene group-containing active hydrogen compound are used.

For the carboxylic acid group-containing active hydrogen compound, for example, dihydroxyl carboxylic acids such as 2,2-dimethylol acetic acid, 2,2-dimethylol lactic acid, 2,2-dimethylol propionic acid (DMPA), 2,2-dimethylol butanoic acid (DMBA), 2,2-dimethylol butyric acid, and 2,2-dimethylol valeric acid; diaminocarboxylic acids such as lysine, and arginine, or their metal salts or ammonium salts are used. Preferably, 2,2-dimethylolpropionic acid (DMPA) and 2,2-dimethylolbutanoic acid (DMBA) are used.

For the sulfonic acid group-containing active hydrogen compound, for example, dihydroxybutanesulfonic acid and dihydroxypropane sulfonic acid that are obtained from synthetic reaction between an epoxy group-containing compound and acid sulfite are used. Examples also include N,N-bis(2-hydroxyethyl)-2-aminoethanesulfonic acid, N,N-bis(2-hydroxyethyl)-2-aminobutanesulfonic acid, 1,3-phenylenediamine-4,6-disulfonic acid, diaminobutanesulfonic acid, diaminopropane sulfonic acid, 3,6-diamino-2-toluenesulfonic acid, 2,4-diamino-5-toluenesulfonic acid, N-(2-aminoethyl)-2-aminoethanesulfonic acid, 2-aminoethanesulfonic acid, N-(2-aminoethyl)-2-aminobutanesulfonic acid, and metal salts or ammonium salts of these sulfonic acids.

For the hydroxyl group-containing active hydrogen compound, for example, N-(2-aminoethyl) ethanolamine is used.

Examples of the hydrophilic group-containing polybasic acid include polybasic acid containing sulfonic acid, to be more specific, 5-sulfoisophthalic acid, sulfoterephthalic acid, 4-sulfophthalic acid, 5-(p-sulfophenoxy) isophthalic acid, 5-(sulfopropoxy) isophthalic acid, 4-sulfonaphthalene-2,7-dicarboxylic acid, sulfopropylmalonic acid, sulfosuccinic acid, 2-sulfobenzoic acid, 2,3-sulfobenzoic acid, 5-sulfosalicylic acid, alkyl ester of those carboxylic acids, and also metal salts and ammonium salts of those sulfonic acids. Preferably, sodium salts of 5-sulfoisophthalic acid, and sodium salts of 5-sulfoisophthalic acid dimethyl ester are used.

The polyoxyethylene group-containing active hydrogen compound is a compound containing a polyoxyethylene group in the main chain or side chain, and having at least one active hydrogen group.

For the polyoxyethylene group-containing active hydrogen compound, for example, polyethylene glycol (e.g., number average molecular weight 200 to 6000, preferably 300 to 3000), one-end-terminated polyoxyethylene glycol (e.g., alkoxyethylene glycol with its one end capped with an alkyl group having 1 to 4 carbon atoms, number average molecular weight 200 to 6000, preferably 300 to 3000), and a polyoxyethylene side chain-containing polyol are used.

The polyoxyethylene side chain-containing polyol is a compound containing a polyoxyethylene group in its side chain and having two or more active hydrogen groups, and can be synthesized in the following manner.

Specifically, first, a urethane-forming reaction is performed by mixing diisocyanate (described later) and a one-end-capped polyoxyethylene glycol (e.g., alkoxy ethylene glycol of which the terminal is capped with an alkyl group of 1 to 4 carbon atoms, having a number average molecular weight of 200 to 6000, or preferably 300 to 3000) at such a ratio that the amount of the isocyanate group in the diisocyanate (described later) exceeds the amount of the hydroxyl group in the one-end-capped polyoxyethylene glycol, and, if necessary, unreacted diisocyanate (described later) is removed from the mixture, to thereby obtain a polyoxyethylene chain-containing monoisocyanate.

Subsequently, a urea-forming reaction is performed by mixing the polyoxyethylene chain-containing monoisocyanate and dialkanolamine (e.g., diethanolamine) at such a ratio that the amount of the isocyanate group in the polyoxyethylene group-containing monoisocyanate is nearly equal to the amount of the secondary amino group in the dialkanolamine.

For the diisocyanate for producing a polyoxyethylene side chain-containing polyol, it is not particularly limited, and a known diisocyanate may be used. Examples of the diisocyanate include, to be more specific, aliphatic diisocyanates such as pentamethylenediisocyanate (PDI)(including pentamethylenediisocyanate of the present invention), and hexamethylene diisocyanate (HDI); and alicyclic diisocyanates such as 1,4- or 1,3-bis(isocyanatomethyl)cyclohexane ($H_6$XDI), 3-isocyanatomethyl-3,5,5-trimethyl cyclohexylisocyanate (also known as isophorone diisocyanate (IPDI)), 4,4'-methylene bis(cyclohexylisocyanate) ($H_{12}$MDI) and 2,6-bis(isocyanatomethyl)norbornane (NBDI).

For the polyoxyethylene group-containing active hydrogen compound, furthermore, for example, monohydric alcohol to which ethylene oxide is added (e.g., polyoxyethylenelaurylether, polyoxyethyleneoleylether, polyoxyethylenestearylether, etc.), polyoxyethylene-containing sorbitan esters (e.g., polyoxyethylenesorbitan oleate, polyoxyethylenesorbitan ricinoleate, polyoxyethylenesorbitan oleate, etc.), polyoxyethylene-containing alkylphenols (e.g., polyoxyethyleneoctylphenolether, polyoxyethylenenonylphenolether, etc.), and polyethylene glycol-containing higher fatty acid esters (e.g., polyethylene glycollaurate, polyethylene glycol oleate, polyethylene glycolstearate, etc.) are used.

The polyisocyanate composition of the present invention can also be used as a blocked isocyanate in which free isocyanate groups contained in the molecule are blocked by a blocking agent.

The blocked isocyanate can be produced, for example, by allowing the polyisocyanate composition to react with the blocking agent.

Examples of the blocking agent include an oxime, phenol, alcohol, imine, amine, carbamic acid, urea, imidazole, imide, mercaptan, active methylene, acid amide (lactam), and bisulfites blocking agent.

Examples of the oxime blocking agent include formaldoxime, acetaldoxime, methyl ethyl ketone oxime, cyclohexanoneoxime, acetoxime, diacetyl monoxime, benzophenone oxime, 2,2,6,6-tetramethylcyclohexanoneoxime, diisopropylketoneoxime, methyltert-butylketoneoxime, diisobutylketoneoxime, methylisobutylketoneoxime, methylisopropylketoneoxime, methyl 2,4-dimethylpentylketoneoxime, methyl 3-ethylheptylketoneoxime, methyl isoamyl ketoneoxime, n-amylketoneoxime, 2,2,4,4-tetramethyl-1,3-cyclobutanedionemonoxime, 4,4'-dimethoxybenzophenoneoxime, and 2-heptanoneoxime.

Examples of the phenol blocking agent include phenol, cresol, ethylphenol, n-propylphenol, isopropylphenol, n-butylphenol, sec-butylphenol, tert-butylphenol, n-hexylphenol, 2-ethylhexylphenol, n-octylphenol, n-nonylphenol, di-n-propylphenol, diisopropylphenol, isopropylcresol, di-n-butylphenol, di-sec-butylphenol, di-tert-butylphenol, di-n-octylphenol, di-2-ethylhexylphenol, di-n-nonylphenol, nitrophenol, bromophenol, chlorophenol, fluorophenol, dimethylphenol, styrenated phenol, methylsalicylate, 4-hydroxybenzoic acid methyl ester, 4-hydroxybenzoic acid benzyl ester, hydroxybenzoic acid 2-ethylhexyl ester, 4-[(dimethylamino) methyl]phenol, 4-[(dimethylamino) methyl] nonylphenol, bis(4-hydroxyphenyl) acetic acid, pyridinol, 2- or 8-hydroxyquinoline, 2-chloro-3-pyridinol, and pyridine-2-thiol.

Examples of the alcohol blocking agent include, for example, methanol, ethanol, 2-propanol, n-butanol, sec-butanol, 2-ethylhexylalcohol, 1- or 2-octanol, cyclohexylalcohol, ethylene glycol, benzylalcohol, 2,2,2-trifluoroethanol, 2,2,2-trichloroethanol, 2-(hydroxymethyl) furan, 2-methoxyethanol, methoxypropanol, 2-ethoxyethanol, n-propoxyethanol, 2-butoxyethanol, 2-ethoxyethoxyethanol, 2-ethoxybutoxyethanol, butoxyethoxyethanol, 2-ethylhexyloxyethanol, 2-butoxyethylethanol, 2-butoxyethoxyethanol, N,N-dibutyl-2-hydroxyacetamido, N-hydroxysuccinimide, N-morpholine ethanol, 2,2-dimethyl-1,3-dioxolane-4-methanol, 3-oxazolidine ethanol, 2-hydroxymethylpyridine, furfuryl alcohol, 12-hydroxystearic acid, triphenylsilanol, and methacrylic acid 2-hydroxyethyl ester.

Examples of the imine blocking agent include ethyleneimine, polyethyleneimine, 1,4,5,6-tetrahydropyrimidine, and guanidine.

Examples of the amine blocking agent include dibutylamine, diphenylamine, aniline, N-methylaniline, carbazole, bis(2,2,6,6-tetramethylpiperidinyl) amine, di-n-propylamine, diisopropylamine, isopropylethylamine, 2,2,4-, or 2,2,5-trimethylhexamethyleneamine, N-isopropylcyclohexylamine, dicyclohexylamine, bis(3,5,5-trimethylcyclohexyl) amine, piperidine, 2,6-dimethylpiperidine, 2,2,6,6-tetramethylpiperidine, (dimethylamino)-2,2,6,6-tetramethylpiperidine, 2,2,6,6-tetramethyl-4-piperidine, 6-methyl-2-piperidine, and 6-aminocaproic acid.

Examples of the carbamic acid blocking agent include N-phenylcarbamate phenyl.

Examples of the urea blocking agent include urea, thiourea, and ethyleneurea.

Examples of the imidazole blocking agent include imidazole, 2-methylimidazole, 2-ethyl-4-methylimidazole, 2-isopropyl imidazole, 2,4-dimethylimidazole, 4-methylimidazole, 2-phenylimidazole, 4-methyl-2-phenylimidazole, pyrazole, 3-methylpyrazole, 3,5-dimethylpyrazole, 1,2,4-triazole, and benzotriazole.

Examples of the imide blocking agent include succinimide, maleimide, and phthal imide.

Examples of the mercaptan blocking agent include butylmercaptan, dodecylmercaptan, and hexylmercaptan.

Examples of the active methylene blocking agent include Meldrum's acid, malonic acid dimethyl ester, methyl acetoacetate, ethyl acetoacetate, malonic acid di-tert-butyl ester, malonic acid 1-tert-butyl 3-methyl ester, malonic acid diethyl ester, acetoacetic acid tert-butyl ester, 2-acetoacetoxyethylmethacrylate, acetylacetone, and cyanoethyl acetate.

Examples of the acid amide (lactam) blocking agent include acetanilide, N-methylacetamide, acetic acidamide, ε-caprolactam, δ-valerolactam, γ-butyrolactam, pyrrolidone, 2,5-piperazine dione, and laurolactam.

The blocking agent is not limited to the above, and for example, other blocking agents such as benzoxazolone, isatoic acid anhydride, and tetrabutylphosphonium.acetate can be used.

These blocking agent can be used singly, or can be used in combination of two or more.

As the blocking agent, those blocking agents that dissociate at preferably 200° C. or less, preferably 100 to 180° C. are used. To be more specific, for example, active methylene compounds such as ethyl acetoacetate, or oximes such as methyl ethyl ketone oxime are used.

The blocked isocyanate can be obtained by blending a polyisocyanate composition with a blocking agent at a proportion such that the blocking agent is excessive relative to the isocyanate group in the polyisocyanate composition, and then allowing the mixture to react under known conditions.

The polyisocyanate composition of the present invention can be used as an aqueous blocked isocyanate in which free isocyanate groups are blocked by a blocking agent, and which is dispersed or dissolved in water.

The method for producing the aqueous blocked isocyanate is not particularly limited, but for example, the following method can be used: first, a polyisocyanate composition (in the following, referred to as partly blocked isocyanate) is produced, in which a portion of the free isocyanate group is blocked by a blocking agent, and thereafter, the free isocyanate groups (remained isocyanate group without being blocked by the blocking agent) of the partly blocked isocyanate is allowed to react with the above-described hydrophilic group-containing active hydrogen compound.

In this method, first, a portion of the free isocyanate groups in the polyisocyanate composition is allowed to react with a blocking agent to produce a partly blocked isocyanate.

For the blocking agent, for example, the above-described blocking agents can be used.

The partly blocked isocyanate can be obtained by blending a polyisocyanate composition with a blocking agent at a proportion such that the isocyanate group in the polyisocyanate composition is excessive relative to the blocking agent, and then allowing the mixture to react under known conditions.

Next, in this method, the free isocyanate group (the remaining portion of the isocyanate group) of the partly blocked isocyanate is allowed to react with a hydrophilic group-containing active hydrogen compound.

The aqueous blocked isocyanate can be produced by blending the partly blocked isocyanate with the hydrophilic group-containing active hydrogen compound at a proportion such that the hydrophilic group-containing active hydrogen compound is excessive relative to the free isocyanate group in the partly blocked isocyanate, and then allowing the mixture to react under known conditions.

Furthermore, by using the polyisocyanate composition of the present invention in production of, for example, coating, overprint varnish (OP varnish), industrial or packaging use adhesive, thermoplastic, thermosetting or millable elastomer, sealant, aqueous resin, thermosetting resin, binder resin (to be specific, a binder resin used for various materials such as rubber chip, granular natural stone, paper, woods, various plastic chips, various metals, toner, and magnetic record material in use for ink, screen printing, and concrete), resin for lens, activation energy setting resin, liquid crystal resin, flexible foam, and rigid foam, their heat resistance, water resistance, chemical resistance, mechanical properties, and electrical properties can be improved.

The polyurethane resin of the present invention can be produced by allowing the above-described polyisocyanate composition to react with an active hydrogen group-containing compound.

That is, the polyurethane resin of the present invention is a reaction product of the above-described polyisocyanate composition with an active hydrogen group-containing compound.

In the present invention, the active hydrogen group-containing compound is, for example, an organic compound having two or more active hydrogen groups such as a hydroxyl group, mercapto group, and amino group in its molecule.

Examples of the active hydrogen group-containing compound include a polyol component, polythiol component, and polyamine component, and preferably, a polyol component is used.

In the present invention, examples of the polyol component include low-molecular-weight polyols and high-molecular weight polyols.

The low-molecular-weight polyol is a compound having two or more hydroxyl groups and a number average molecular weight of 60 or more less than 300, preferably less than 400, and examples thereof include dihydric alcohols such as ethylene glycol, propylene glycol, 1,3-propanediol, 1,4-butyleneglycol, 1,3-butyleneglycol, 1,2-butyleneglycol, 1,5-pentanediol, 1,6-hexanediol, neopentyl glycol, 3-methyl-1,5-pentanediol, 2,2,2-trimethylpentanediol, 3,3-dimethylolheptane, alkane (C7 to 20) diol, 1,3- or 1,4-cyclohexanedimethanol and a mixture thereof, 1,3- or 1,4-cyclohexanediol and a mixture thereof, hydrogenated bisphenol A, 1,4-dihydroxy-2-butene, 2,6-dimethyl-1-octene-3,8-diol, bisphenol A, diethylene glycol, triethylene glycol, and dipropylene glycol; trihydric alcohols such as glycerin, trimethylolpropane, and triisopropanolamine; tetrahydric alcohols such as tetramethylolmethane (pentaerythritol) and diglycerin; pentahydric alcohols such as xylitol; hexahydric alcohols such as sorbitol, mannitol, allitol, iditol, dulcitol, altritol, inositol, and dipentaerythritol; heptahydric alcohol such as perseitol; and octahydric alcohols such as sucrose.

These low-molecular-weight polyols may be used singly or in combination of two or more.

The high-molecular weight polyol is a compound having two or more hydroxyl groups and a number average molecular weight of 300 or more, preferably 400 or more, even more preferably 500 or more and 10000 or less, and examples thereof include polyetherpolyol (for example, polyoxyalkylene polyol, polytetramethylene ether polyol, etc), polyesterpolyol (for example, adipic acid polyesterpolyol, phthalic acid polyesterpolyol, lactone-based polyester polyol, etc), polycarbonatepolyol, polyurethane polyol (for example, polyol produced by urethane-modifying, for example, polyetherpolyol, polyesterpolyol, and polycarbonatepolyol with polyisocyanate), epoxy polyol, vegetable oil polyol, polyolefinpolyol, acrylic polyol, and vinyl monomer-modified polyol.

These high-molecular weight polyols may be used singly or in combination of two or more.

The polyurethane resin can be produced by, for example, polymerization methods such as bulk polymerization or solution polymerization.

In bulk polymerization, for example, the polyisocyanate composition is stirred under nitrogen gas stream, and an active hydrogen group-containing compound is added thereto, and the mixture is allowed to react at a reaction temperature of 50 to 250° C., more preferably at 50 to 200° C. for about 0.5 to 15 hours.

In solution polymerization, to an organic solvent that is the same as the organic solvent used for diluting the above-described polyisocyanate composition, a polyisocyanate composition and an active hydrogen group-containing compound are added, and the mixture is allowed to react at a reaction temperature of 50 to 120° C., preferably at 50 to 100° C. for about 0.5 to 15 hours.

Furthermore, in the above-described polymerization reaction, as necessary, for example, a known urethanizing catalyst can be added.

In bulk polymerization and solution polymerization, for example, the polyisocyanate composition and the active hydrogen group-containing compound are blended so that the equivalent ratio (NCO/active hydrogen group) of the isocyanate group in the polyisocyanate composition relative to the active hydrogen group (hydroxyl group, mercapto group, amino group) in the active hydrogen group-containing compound is, for example, 0.75 to 1.3, preferably 0.9 to 1.1.

When the above-described polymerization reaction is to be performed more industrially, the polyurethane resin can be obtained by known methods such as, for example, one-shot method and prepolymer method.

In one-shot method, for example, the polyisocyanate composition and the active hydrogen group-containing compound are formulated (mixed) so that the equivalent ratio (NCO/active hydrogen group) of the isocyanate group in the polyisocyanate composition relative to the active hydrogen group (hydroxyl group, mercapto group, amino group) in the active hydrogen group-containing compound is, for example, 0.75 to 1.3, preferably 0.9 to 1.1, and thereafter, the mixture is allowed to react (curing reaction), for example, at room temperature to 250° C., preferably at room temperature to 200° C., for, for example, 5 minutes to 72 hours, preferably 4 to 24 hours. The curing temperature may be a constant temperature, or may be increased/decreased stepwise.

In prepolymer method, for example, first, the polyisocyanate composition and a portion of the active hydrogen group-containing compound (preferably, high-molecular weight polyol) are allowed to react, thereby synthesizing an isocyanate group-terminated prepolymer having isocyanate groups at its molecular terminals. Then, the obtained isocyanate group-terminated prepolymer is allowed to react with the remaining portion of the active hydrogen group-containing compound (preferably, low-molecular-weight polyol and/or polyamine component), thereby causing chain extension reaction. In the prepolymer method, the remaining portion of the active hydrogen group-containing compound is used as a chain extender.

To synthesize the isocyanate group-terminated prepolymer, the polyisocyanate composition and a portion of the active hydrogen group-containing compound are formulated (mixed) so that the equivalent ratio (NCO/active hydrogen group) of the isocyanate group in the polyisocyanate composition relative to the active hydrogen group in the portion of the active hydrogen group-containing compound is, for example, 1.1 to 20, preferably 1.3 to 10, more preferably 1.3 to 6, and then the mixture is allowed to react in the reaction vessel, for example, at room temperature to 150° C., preferably at 50 to 120° C., for, for example, 0.5 to 18 hours, preferably 2 to 10 hours. In this reaction, as necessary, the above-described urethane-forming catalyst may be added, and after the completion of reaction, as necessary, the unreacted monomer can be removed, for example, by a known removal method such as distillation or extraction.

Then, to cause the reaction between the obtained isocyanate group-terminated prepolymer and the remaining portion of the active hydrogen group-containing compound, the isocyanate group-terminated prepolymer and the remaining portion of the active hydrogen group-containing compound are formulated (mixed) so that the equivalent ratio (NCO/active hydrogen group) of the isocyanate group in the isocyanate group-terminated prepolymer relative to the active hydrogen group in the remaining portion of the active hydrogen group-containing compound is, for example, 0.75 to 1.3, preferably 0.9 to 1.1, and the mixture is allowed to react (curing reaction), for example, at room temperature to 250° C., preferably at room temperature to 200° C., for, for example, 5 minutes to 72 hours, preferably 1 to 24 hours.

In this manner, the polyurethane resin can be produced.

The polyurethane resin can also be obtained as an aqueous polyurethane dispersion. In such a case, for example, first, a polyisocyanate composition is allowed to react with the above-described active hydrogen compound including a hydrophilic group-containing active hydrogen compound (excluding the compound having only one active hydrogen group), thereby producing an isocyanate group-terminated prepolymer.

Then, the produced isocyanate group-terminated prepolymer and a chain extender are allowed to react in water and dispersed. In this manner, an aqueous polyurethane resin can be produced as an internally emulsified aqueous polyurethane dispersion by subjecting the isocyanate group-terminated prepolymer to chain extension reaction.

To cause the isocyanate group-terminated prepolymer to react with the chain extender in water, for example, first, the isocyanate group-terminated prepolymer is added to water, thereby dispersing the isocyanate group-terminated prepolymer. Thereafter, a chain extender is added thereto, thereby subjecting the isocyanate group-terminated prepolymer to chain extension reaction.

As the chain extender, for example, low-molecular-weight polyols such as the above-described dihydric alcohol, and the above-described trihydric alcohol; and diamines such as alicyclic diamines and aliphatic diamines may be used.

These chain extenders can be used singly, or can be used in combination of two or more.

When an active hydrogen compound including a hydrophilic group-containing active hydrogen compound is used, as necessary, a hydrophilic group is neutralized with a known neutralizing agent in this manner.

When the hydrophilic group-containing active hydrogen compound is not used as the active hydrogen compound, the polyurethane resin can be obtained as an externally emulsified aqueous polyurethane dispersion by emulsification, for example, using a known surfactant.

To produce polyurethane resin as an aqueous polyurethane dispersion, for example, first, the hydrophilic group-containing active hydrogen compound is added to water to be dispersed. Then, a polyisocyanate composition and/or aqueous polyisocyanate composition is added to allow reaction with the hydrophilic group-containing active hydrogen compound.

In such a case, as the hydrophilic group-containing active hydrogen compound, preferably a hydrophilic group-containing active hydrogen compound having a nonionic group is used.

For the hydrophilic group-containing active hydrogen compound, for example, a compound in which a hydrophilic group is introduced into low-molecular-weight polyol and a high-molecular weight polyol can also be used.

When producing polyurethane resin, as necessary, furthermore, a known additive, for example, such as a plasticizer, anti-blocking agent, heat resistant stabilizer, light stabilizer, antioxidant, releasing agent, catalyst, and also pigment, dye, lubricant, filler, and hydrolysis inhibitor can be blended at a suitable ratio. These additives can be added at the time of synthesis of the components, or can be added at the time of mixing and dissolving the components, and furthermore, can be added after the synthesis.

The polyurethane resin of the present invention has a smoothness Sw (Short Wave mode)(measured in accordance with Examples to be described later) of, for example, 4.2 or more, and for example, 6.0 or less, preferably 5.6 or less, more preferably, 5.5 or less, even more preferably 5.0 or less, even more preferably 4.8 or less.

The polyurethane resin of the present invention has a smoothness Lw (Long Wave mode)(measured in accordance with Examples to be described later) of, for example, 13.0 or more, and for example, 25.0 or less, preferably 23.0 or less, more preferably 22.0 or less, even more preferably 18.0 or less, even more preferably 15.0 or less, even more preferably 14.6 or less, particularly preferably, 14.0 or less.

The polyurethane resin of the present invention has a hardness (Martens hardness)(measured in accordance with Examples to be described later) of, for example, 60 N/mm$^2$ or more, preferably 65 N/mm$^2$ or more, more preferably, 70 N/mm$^2$ or more, even more preferably 80 N/mm$^2$ or more, even more preferably 85 N/mm$^2$ or more, even more preferably 86 N/mm$^2$ or more, even more preferably 88 N/mm$^2$ or more, even more preferably 89 N/mm$^2$ or more, and for example, 90 N/mm$^2$ or less.

The polyurethane resin of the present invention has an adherence (measured in accordance with Examples to be described later) of, generally 0 or more, and for example, less than 4, preferably 2 or less, more preferably 1 or less.

The polyurethane resin of the present invention has a chemical resistance (measured in accordance with Examples to be described later) of, for example, 65 times or more, preferably 80 times or more, more preferably, 100 times or more, even more preferably 105 times or more, even more preferably 110 times or more, even more preferably 120 times or more, even more preferably 130 times or more, even more preferably 135 times or more, and for example, 140 times or less.

The polyurethane resin of the present invention has a bending resistance (measured in accordance with Examples to be described later) of, for example, 2 mm (no peeling) or more, and for example, 5 mm or less, preferably 4 mm or less, more preferably 3 mm or less, even more preferably less than 3 mm.

Such polyurethane resin is produced by using the polyisocyanate composition of the present invention, and therefore its hardness and chemical resistance are excellent.

Therefore, such polyurethane resin can be used in a wide range of fields, such as, for example, a film coating agent, various inks, pressure-sensitive adhesive, sealing agent, various microcapsules, plastic lens, artificial or synthetic leather, RIM molded product, slush powder, elastic molded article (spandex), and urethane foam.

The polyisocyanate composition of the present invention can also be used as a curing agent for a two-component curable polyurethane composition.

The two-component curable polyurethane composition contains, as the curing agent, a polyisocyanate composition, and as the main component, a polyol component.

The polyisocyanate composition (curing agent) is the above-described polyisocyanate composition.

To the polyisocyanate composition (curing agent), as necessary, the above-described organic solvent can be added.

When an organic solvent is added to the polyisocyanate composition (curing agent), the blending amount is not particularly limited, and is set suitably in accordance with purpose and use.

For the polyol component (main component), the above-described polyol component is used. The polyol component can be used singly, or can be used in combination of two or more. For the polyol component, preferably, a high-molecular weight polyol is used.

To the polyol component (main component), as necessary, the above-described organic solvent can be added.

When an organic solvent is added to the polyol component (main component), the blending amount is not particularly limited, and is set suitably in accordance with purpose and use.

Then, in the two-component curable polyurethane composition, the polyisocyanate composition (curing agent) and the polyol component (main component) are prepared separately, and they are blended and mixed when in use.

The polyisocyanate composition (curing agent) and the polyol component (main component) are blended in an amount such that the equivalent ratio (OH/NCO) of the hydroxyl group in the polyol component (main component) relative to the isocyanate group in the polyisocyanate composition (curing agent) is, for example, 0.5 or more, preferably 0.75 or more, and for example, 2 or less, preferably 1.5 or less.

To one or both of the polyisocyanate composition (curing agent) and the polyol component (main component), as necessary, additives such as, for example, epoxy resin, catalyst, coating improving agent, leveling agent, antifoaming agent, stabilizers including antioxidant, and ultraviolet ray absorber, a plasticizer, surfactant, pigment (for example, titanium oxide), filler, organic or inorganic fine particles, antifungal agent, and silane coupling agent can be blended. The amount of these additives to be blended can be determined suitably in accordance with its purpose and use.

The polyurethane resin produced from the two-component curable polyurethane composition can be obtained using the polyisocyanate composition of the present invention, and therefore its hardness and chemical resistance are excellent.

Therefore, such a two-component curable polyurethane composition is suitably used in various industrial fields, for example, a coating (coating for plastic, automotive paint), adhesive, coating agent, ink, and sealant, and in particular, in the industrial field of coating.

In other words, the coating, adhesive, coating agent, ink, and sealant include the above-described polyurethane resin of the present invention, and preferably the coating includes the above-described polyurethane resin of the present invention.

EXAMPLES

While in the following, the present invention is described with reference to Examples and Comparative Examples, the present invention is not limited to any of them. The "parts" and "%" are based on mass unless otherwise noted. The specific numeral values used in the description below, such as mixing ratio (content), physical property values, and parameters can be replaced with corresponding mixing ratio (content), physical property values, parameters in the above-described "DESCRIPTION OF EMBODIMENTS", including the upper limit value (numeral values defined with "or less", and "less than") or the lower limit value (numeral values defined with "or more", and "more than").

The measurement method used in Examples and Comparative Examples are described below.

1. Measurement Method

<Isocyanate Monomer Concentration (unit: mass %)>

Pentamethylenediisocyanate produced in the same manner as in Example 1 of DESCRIPTION of WO 2012/121291 or commercially available hexamethylenediisocyanate as a standard sample is used, and labeled with dibenzylamine. The unreacted isocyanate monomer (pentamethylenediisocyanate, hexamethylenediisocyanate) concentration was calculated based on the calibration curve made from the area value of a chromatogram obtained under HPLC analysis conditions below.

Device; Prominence (manufactured by Shimadzu Corporation)
1) Pump LC-20AT
2) Degasser DGU-20A3
3) Autosampler SIL-20A
4) Column constant temperature bath COT-20A
5) Detector SPD-20A
Column; SHISEIDO SILICA SG-120
Column temperature; 40° C.
Eluent; n-hexane/methanol/1,2-dichloroethane=90/5/5 (volume ratio)
Flow rate; 0.2 mL/min
Detection method; UV 225 nm <Isocyanate Group Content (unit: mass %)>

The isocyanate group content was calculated based on the measurement results of the toluene/dibutylamine.ydrochloric acid method using a potential difference titrator, in accordance with JIS K-1603-1 (2007).

<Viscosity (unit: mPa·s)>

The viscosity of the measurement sample was measured at 25° C. using type E viscometer TV-30 (rotor angle: 1°34', rotor diameter: 24 cm) manufactured by TOM Sangyo Co., Ltd. in accordance with Corn and plate method of JIS K5600-2-3 (2014). The number of revolution of the corn and plate at the time of measurement was changed suitably in the range of 100 rpm to 2.5 rpm in accordance with the increase in the viscosity.

<Gel Permeation Chromatography (GPC) Measurement Conditions>

The reaction liquid or polyisocyanate composition was taken in an amount of about 0.04 g, and subjected to methylurethane-formation with methanol. Thereafter, excessive methanol was removed, and 10 mL of tetrahydrofuran was added and dissolved. This was used as a sample. The obtained sample was subjected to GPC measurement with the following conditions.

Device; HLC-8020 (manufactured by Tosoh Corporation)
Injection amount; 100 µL
Column; G1000HXL, G2000HXL, and G3000HXL (all manufactured by TOSOH CORPORATION, trade name) connected in series
Column temperature; 40° C.
Eluent; tetrahydrofuran
Flow rate; 0.8 mL/min
Detection method; refractive index
Standard sample; polyethylene glycol (manufactured by Tosoh Corporation, trade name: TSK standard polyethylene glycol)

<Derivative Content Calculation Based on GPC (unit: mass %)>

In the chromatogram obtained with the above-described GPC measurement conditions, the peak area having a peak top within a predetermined range for the polyethylene glycol-based molecular weight was defined as the area for the derivative (uretdione bimolecular-product, allophanate bimolecular-product, isocyanate trimolecular-product, and isocyanate quadmolecular-product). The derivative content relative to a total amount of the polyisocyanate composition was calculated as the ratio of the area corresponding to the derivative relative to the total peak area.

The value of the polyethylene glycol-based molecular weight was calculated from a calibration curve made based on the peak value of a chromatogram, subjecting the above-described standard sample in advance to GPC measurement with the above measurement conditions.

The uretdione bimolecular-product content was calculated as a ratio of a peak area having a peak top between 280 or more and 350 or less of polyethylene glycol-based molecular weight relative to a total area of the peaks.

The allophanate bimolecular-product content was calculated as a ratio of a peak area having a peak top between more than 350 and 410 or less of polyethylene glycol-based molecular weight relative to a total area of the peaks.

The isocyanate trimolecular-product content was calculated as a ratio of a peak area having a peak top between more than 410 and 490 or less of polyethylene glycol-based molecular weight relative to a total area of the peaks.

The isocyanate quadmolecular-product content was calculated as a ratio of a peak area having a peak top between 580 or more and 730 or less of polyethylene glycol-based molecular weight relative to a total area of the peaks.

<Ratio of Bimolecular-Product and Trimolecular-Poduct Aea (unit:%)>

In a GPC chromatogram used for the derivative content, the peak area having a peak top between 280 or more and 490 or less of polyethylene glycol-based molecular weight was defined as the area for the bimolecular-product and trimolecular-product, and the ratio of the area for the bimolecular-product and trimolecular-product relative to a total area of the peaks was defined as the ratio of bimolecular-product and trimolecular-product area.

<Ratio of Uretdione Bimolecular-Product Relative to Isocyanate Trimolecular-Product>

The ratio of the uretdione bimolecular-product relative to the isocyanate trimolecular-product was calculated with the following formula.

Ratio of uretdione bimolecular-product to isocyanate trimolecular-product=uretdione bimolecular-product content/isocyanate trimolecular-product content <Reaction Rate of the Isocyanate Group (unit:%)>

With the above-described isocyanate group content measurement method, the isocyanate group content was measured, and the reaction rate of the isocyanate group was calculated with the following formula.

Reaction rate of the isocyanate group=[100−isocyanate group content (mass %) at the time of isocyanurate-formation reaction termination/isocyanate group content (mass %) at the time of urethane-forming reaction termination×100]

<Isocyanate Group Conversion Rate (unit:%)>

The isocyanate group conversion rate was determined based on the ratio of the peak area having a peak on a higher molecular weight side than the peak of the pentamethylenediisocyanate (120 to 180 of polyethylene glycol-based molecular weight) relative to a total area of the peaks in the chromatogram obtained with the above-described GPC measurement conditions.

2. Material (1) Preparation Example of Polyisocyanate Composition

Preparation Example 1 (Preparation of Polyisocyanate Composition A)

A four-neck flask equipped with a stirrer, a thermometer, a reflux pipe, and a nitrogen inlet tube was charged with 500 parts by mass of pentamethylenediisocyanate (in the following, may be referred to as PDI) produced in the same manner as in Example 1 of DESCRIPTION of WO 2012/121291, 0.3 parts by mass of 1,3-butanediol (in the following, may be referred to as 1, 3-BG), 0.3 parts by mass of 2,6-di (tert-butyl)-4-methylphenol (in the following, may be referred to as BHT), and 0.3 parts by mass of tris (tridecyl) phosphite, and the mixture was subjected to urethane-forming reaction at 80° C. for 2 hours. The isocyanate group content after the urethane-forming reaction was 54.4 mass %.

Then, 0.05 parts by mass of N-(2-hydroxypropyl)-N,N,N-trimethylammonium-2-ethylhexanoate was added as the isocyanurate-formation catalyst. The isocyanate group content was measured, and the reaction was continued until the content reached 47.6 mass % (that is, reaction rate of the isocyanate group 10%). A predetermined reaction rate (reaction rate: 10%) was reached after 50 minutes, and 0.12 parts by mass of o-toluenesulfonamide was added. The produced reaction mixture was allowed to pass through a thin film distillation device (temperature: 120° C., degree of vacuum:

0.093 kPa) to remove unreacted pentamethylenediisocyanate, and furthermore, relative to 100 parts by mass of the produced polyisocyanate composition, 0.02 parts by mass of o-toluenesulfonamide was added, thereby producing polyisocyanate composition a.

Example 1 (Preparation of Polyisocyanate Composition A)

A four-neck flask equipped with a stirrer, a thermometer, a reflux pipe, and a nitrogen inlet tube was charged with 500 parts by mass of PDI produced in the same manner as in Example 1 of DESCRIPTION of WO2012/121291, 6.9 parts by mass of isobutylalcohol (in the following, may be referred to as IBA), 0.3 parts by mass of BHT, and 0.3 parts by mass of tris (tridecyl) phosphite, and the mixture was subjected to urethane-forming reaction at 80° C. for 2 hours. The isocyanate group content after the urethane-forming reaction was 53.0 mass %.

Then, 0.05 parts by mass of N-(2-hydroxypropyl)-N,N,N-trimethylammonium-2-ethylhexanoate was added as an isocyanurate-formation catalyst. The isocyanate group content was measured, and the reaction was continued until the content reached 47.7 mass % (that is, reaction rate of the isocyanate group 10%). A predetermined reaction rate (reaction rate1 0%) was reached after 50 minutes, and 0.12 parts by mass of o-toluenesulfonamide was added to terminate the reaction. Thereafter, the temperature in the flask was increased to 150° C., and heat treatment was performed for 1.5 hours. The reaction mixture produced in this manner was allowed to pass through a thin film distillation device (temperature: 120° C., degree of vacuum: 0.093 kPa) to remove unreacted pentamethylenediisocyanate, and furthermore, relative to 100 parts by mass of the produced polyisocyanate composition, 0.02 parts by mass of o-toluenesulfonamide was added, thereby producing polyisocyanate composition A.

Example 2 (Preparation of Polyisocyanate Composition B)

A four-neck flask equipped with a stirrer, a thermometer, a reflux pipe, and a nitrogen inlet tube was charged with 500 parts by mass of PDI produced in the same manner as in Example 1 of DESCRIPTION of WO2012/121291, 6.9 parts by mass of IBA, 0.3 parts by mass of BHT, and 0.3 parts by mass of tris (tridecyl) phosphite, and the mixture was subjected to urethane-forming reaction at 80° C. for 2 hours. The isocyanate group content after the urethane-forming reaction was 53.0 mass %.

Then, 0.05 parts by mass of N-(2-hydroxypropyl)-N,N,N-trimethylammonium-2-ethylhexanoate was added as the isocyanurate-formation catalyst. The isocyanate group content was measured, and the reaction was continued until the content reached 47.7 mass % (that is, reaction rate of the isocyanate group 10%). A predetermined reaction rate (reaction rate 10%) was reached after 50 minutes, and 0.12 parts by mass of o-toluenesulfonamide was added to terminate the reaction. Thereafter, the temperature in the flask was increased to 150° C., and heat treatment was performed for 3 hours. The reaction mixture produced in this manner was allowed to pass through a thin film distillation device (temperature: 120° C., degree of vacuum: 0.093 kPa) to remove unreacted pentamethylenediisocyanate, and furthermore, relative to 100 parts by mass of the produced polyisocyanate composition, 0.02 parts by mass of o-toluenesulfonamide was added, thereby producing polyisocyanate composition B. FIG. 1 shows a chromatogram of polyisocyanate composition B subjected to gel permeation chromatography.

Example 3 (Preparation of Polyisocyanate Composition C)

A four-neck flask equipped with a stirrer, a thermometer, a reflux pipe, and a nitrogen inlet tube was charged with 500 parts by mass of PDI produced in the same manner as in Example 1 of DESCRIPTION of WO2012/121291 and 4 parts by mass of 1,3-BG, and the mixture was subjected to urethane-forming reaction at 80° C. for 2 hours. The isocyanate group content after the urethane-forming reaction was 53.2 mass %.

Then, the internal temperature of the flask was set to 60° C., and 1.6 parts by mass of tri-n-butylphosphine was added as the catalyst. The isocyanate group content was measured, and the reaction was continued until the content reached 35.3 mass % (that is, reaction rate of the isocyanate group 34%). A predetermined reaction rate (reaction rate: 34%) was reached after 4 hours, and 1.6 parts by mass of p-toluenesulfonic acid methyl was added to terminate the reaction. The reaction mixture produced in this manner was allowed to pass through a thin film distillation device (temperature: 120° C., degree of vacuum: 0.093 kPa) to remove unreacted pentamethylenediisocyanate, and furthermore, relative to 100 parts by mass of the produced polyisocyanate composition, 0.02 parts by mass of o-toluenesulfonamide was added, thereby producing polyisocyanate composition C.

Example 4 (Preparation of Polyisocyanate Composition D)

A four-neck flask equipped with a stirrer, a thermometer, a reflux pipe, and a nitrogen inlet tube was charged with 500 parts by mass of PDI produced in the same manner as in Example 1 of DESCRIPTION of WO2012/121291 and 4 parts by mass of 1,3-BG, and the mixture was subjected to urethane-forming reaction at 80° C. for 2 hours. The isocyanate group content after the urethane-forming reaction was 53.2 mass %.

Figure 2:
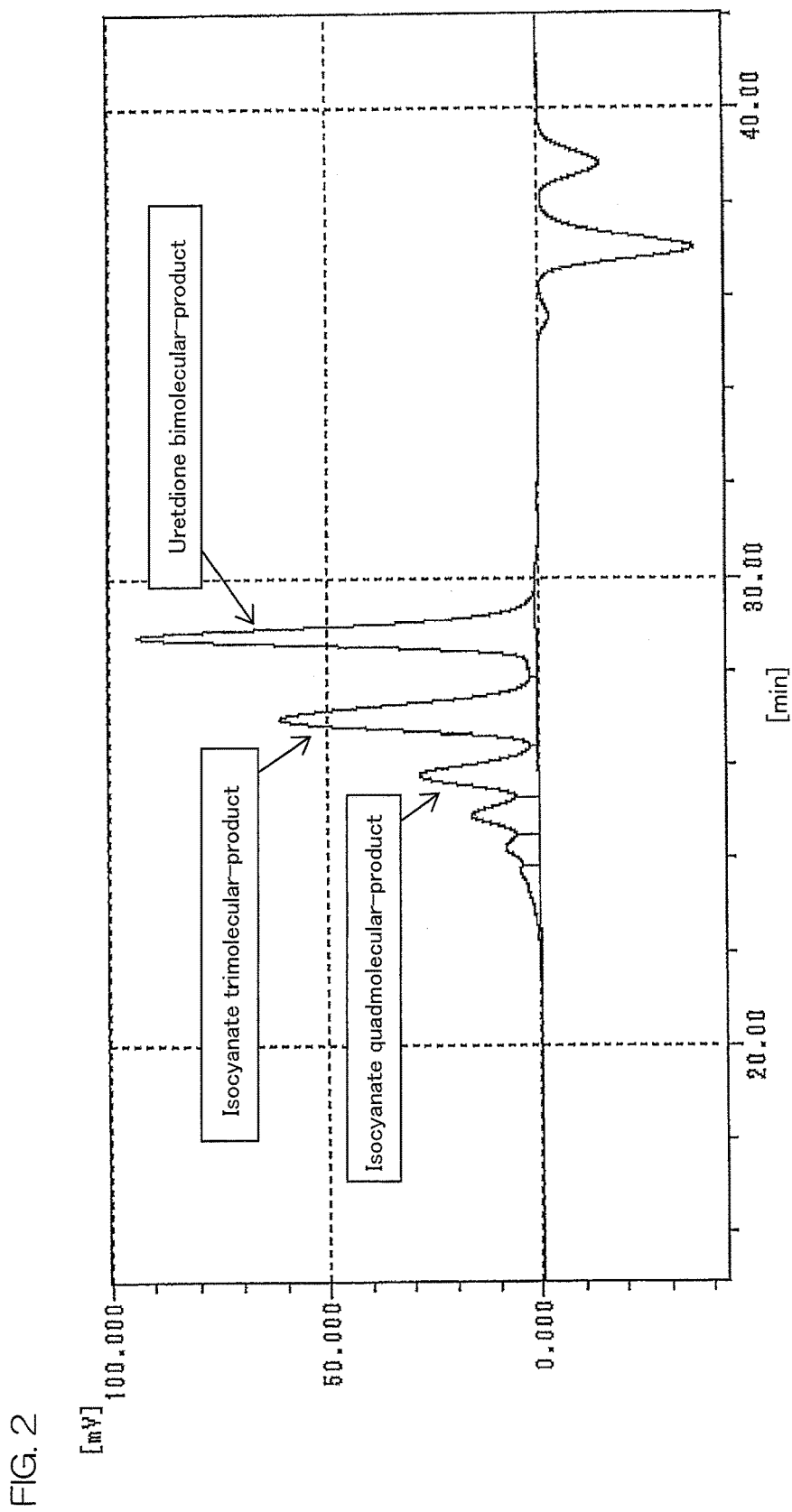
FIG. 2 is a chromatogram of gel permeation chromatograph measurement of the polyisocyanate composition of Example 4.

Then, the internal temperature of the flask was set to 60° C., and 1.6 parts by mass of tri-n-butylphosphine was added as the catalyst. The isocyanate group content was measured, and the reaction was continued until the content reached 39.7 mass % (that is, reaction rate of the isocyanate group 25%). A predetermined reaction rate (reaction rate: 25%) was reached after 2.5 hours, and 1.6 parts by mass of p-toluenesulfonic acid methyl was added to terminate the reaction. The reaction mixture produced in this manner was allowed to pass through a thin film distillation device (temperature: 120° C., degree of vacuum: 0.093 kPa) to remove unreacted pentamethylenediisocyanate, and furthermore, relative to 100 parts by mass of the produced polyisocyanate composition, 0.02 parts by mass of o-toluenesulfonamide was added, thereby producing polyisocyanate composition D. FIG. 2 shows a chromatogram of polyisocyanate composition D subjected to gel permeation chromatography.

Example 5 (Preparation of Polyisocyanate Composition E)

A four-neck flask equipped with a stirrer, a thermometer, a reflux pipe, and a nitrogen inlet tube was charged with 500 parts by mass of PDI produced in the same manner as in Example 1 of DESCRIPTION of WO2012/121291 and 25 parts by mass of IBA, and the mixture was subjected to urethane-forming reaction at 80° C. for 2 hours. The isocyanate group content after the urethane-forming reaction was 49.2 mass %.

Then, the internal temperature of the flask was set to 60° C., and as the catalyst, 1.6 parts by mass of tri-n-butylphosphine was added. The isocyanate group content was measured, and the reaction was continued until the content reached 36.7 mass % (that is, reaction rate of the isocyanate group 25%). A predetermined reaction rate (reaction rate: 25%) was reached after 2.5 hours, and 1.6 parts by mass of p-toluenesulfonic acid methyl was added. Then, 0.1 parts by mass of lead octoate was added, and the internal temperature was set to 100° C. After keeping the temperature for 8 hours, 0.1 parts by mass of o-toluenesulfonamide was added to terminate the reaction. The reaction mixture produced in this manner was allowed to pass through a thin film distillation device (temperature: 120° C., degree of vacuum: 0.093 kPa) to remove unreacted pentamethylenediisocyanate, and furthermore, relative to 100 parts by mass of the produced polyisocyanate composition, 0.02 parts by mass of o-toluenesulfonamide was added, thereby producing polyisocyanate composition E.

Example 6 (Preparation of Polyisocyanate Composition F)

A four-neck flask equipped with a stirrer, a thermometer, a reflux pipe, and a nitrogen inlet tube was charged with 500 parts by mass of PDI produced in the same manner as in Example 1 of DESCRIPTION of WO2012/121291 and 0.5 parts by mass of IBA, and the mixture was subjected to urethane-forming reaction at 80° C. for 2 hours. The isocyanate group content after the urethane-forming reaction was 54.4 mass %.

Then, 0.05 parts by mass of N-(2-hydroxypropyl)-N,N,N-trimethylammonium-2-ethylhexanoate was added as the isocyanurate-formation catalyst. The isocyanate group content was measured, and the reaction was continued until the content reached 49.1 mass % (that is, reaction rate of the isocyanate group 9.7% (isocyanate group conversion rate 20 mass %)). A predetermined conversion rate (conversion rate: 20 mass %) was reached after 100 minutes, and 0.02 parts by mass of phosphoric acid was added to terminate the reaction. Thereafter, the temperature in the flask was increased to 160° C., and heat treatment was performed for 1 hour. The reaction mixture produced in this manner was allowed to pass through a thin film distillation device (temperature: 120° C., degree of vacuum: 0.093 kPa) to remove unreacted pentamethylenediisocyanate, and furthermore, relative to 100 parts by mass of the produced polyisocyanate composition, 0.02 parts by mass of o-toluenesulfonamide was added, thereby producing polyisocyanate composition F.

Example 7 (Preparation of Polyisocyanate Composition G)

Polyisocyanate composition G was produced in the same manner as in Example 6, except that the reaction was continued until the reaction rate of the isocyanate group reached 15.1% (isocyanate group conversion rate of 31 mass %).

Example 8 (Preparation of Polyisocyanate Composition H)

Polyisocyanate composition H was produced in the same manner as in Example 6, except that reaction was continued until the reaction rate of the isocyanate group reached 17.7% (isocyanate group conversion rate of 36 mass %).

Example 9 (Preparation of Polyisocyanate Composition I)

A four-neck flask equipped with a stirrer, a thermometer, a reflux pipe, and a nitrogen inlet tube was charged with 500 parts by mass of PDI produced in the same manner as in Example 1 of DESCRIPTION of WO2012/121291, 0.3 parts by mass of BHT, and 0.3 parts by mass of tris (tridecyl) phosphite in a nitrogen atmosphere, and nitrogen was introduced for 1 hour. Thereafter, the temperature of the reaction liquid was increased to 150° C.

Figure 3:
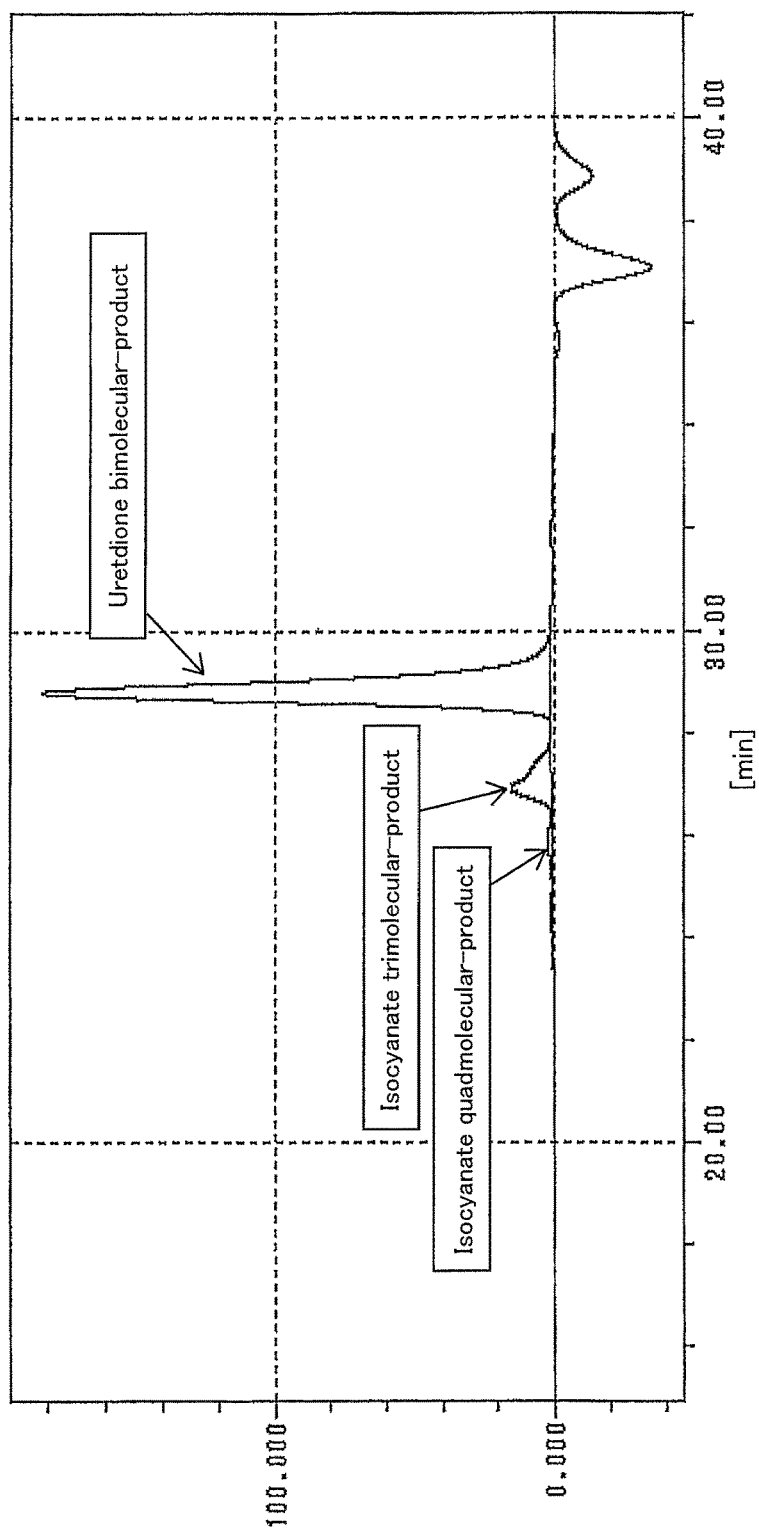
FIG. 3 is a chromatogram of gel permeation chromatograph measurement of the polyisocyanate composition of Example 9.

Then, after the reaction was continued at the same temperature for 10 hours, the reaction was terminated. The reaction mixture produced in this manner was allowed to pass through a thin film distillation device (temperature: 120° C., degree of vacuum: 0.093 kPa) to remove unreacted pentamethylenediisocyanate, thereby producing polyisocyanate composition I. FIG. 3 shows a chromatogram of the polyisocyanate composition I subjected to gel permeation chromatography.

Example 10 (Preparation of Polyisocyanate Composition J)

A four-neck flask equipped with a stirrer, a thermometer, a reflux pipe, and a nitrogen inlet tube was charged with 164 parts by mass of the polyisocyanate composition a of Preparation Example 1 and 336 parts by mass of the polyisocyanate composition I of Example 9. The mixture was stirred in a nitrogen atmosphere at room temperature for 30 minutes, thereby producing polyisocyanate composition J.

Example 11 (Preparation of Polyisocyanate Composition K)

A four-neck flask equipped with a stirrer, a thermometer, a reflux pipe, and a nitrogen inlet tube was charged with 220 parts by mass of polyisocyanate composition a of Preparation Example 1 and 280 parts by mass of the polyisocyanate composition I of Example 9. The mixture was stirred in a nitrogen atmosphere at room temperature for 30 minutes, thereby producing polyisocyanate composition K.

Example 12 (Preparation of Polyisocyanate Composition L)

A four-neck flask equipped with a stirrer, a thermometer, a reflux pipe, and a nitrogen inlet tube was charged with 500 parts by mass of PDI produced in the same manner as in Example 1 of DESCRIPTION of WO2012/121291 and 0.8 parts by mass of IBA, and the mixture was subjected to urethane-forming reaction at 80° C. for 2 hours. The isocyanate group content after the urethane-forming reaction was 54.3 mass %.

Then, the internal temperature of the flask was set to 60° C., and 1.6 parts by mass of tri-n-butylphosphine was added as the catalyst. The isocyanate group content was measured, and the reaction was continued until the content reached 36.1 mass % (that is, reaction rate of the isocyanate group 34%). A predetermined reaction rate (reaction rate: 34%) was reached after 4 hours, and 1.6 parts by mass of p-toluenesulfonic acid methyl was added to terminate the reaction. The reaction mixture produced in this manner was allowed to pass through a thin film distillation device (temperature: 120° C., degree of vacuum: 0.093 kPa) to remove unreacted pentamethylenediisocyanate, and furthermore, relative to 100 parts by mass of the produced polyisocyanate composition, 0.02 parts by mass of o-toluenesulfonamide was added, thereby producing polyisocyanate composition L.

Comparative Example 1 (Preparation of Polyisocyanate Composition M)

A four-neck flask equipped with a stirrer, a thermometer, a reflux pipe, and a nitrogen inlet tube was charged with 491 parts by mass of polyisocyanate composition a of Preparation Example 1 and 9 parts by mass of the polyisocyanate composition I of Example 9. The mixture was stirred in a nitrogen atmosphere at room temperature for 30 minutes, thereby producing polyisocyanate composition M.

Comparative Example 2 (Preparation of Polyisocyanate Composition N)

A four-neck flask equipped with a stirrer, a thermometer, a reflux pipe, and a nitrogen inlet tube was charged with 500 parts by mass of PDI produced in the same manner as in Example 1 of DESCRIPTION of WO2012/121291, 0.3 parts by mass of BHT, and 0.3 parts by mass of tris (tridecyl) phosphite in a nitrogen atmosphere, and nitrogen was introduced for 1 hour. Thereafter, the temperature of the reaction liquid was increased to 150° C.

Then, after the reaction was continued at the same temperature for 1 hour, the reaction was terminated. The reaction mixture produced in this manner was allowed to pass through a thin film distillation device (temperature: 120° C., degree of vacuum: 0.093 kPa) to remove unreacted pentamethylenediisocyanate, thereby producing polyisocyanate composition N.

Comparative Example 3 (Preparation of Polyisocyanate Composition O)

Polyisocyanate composition O was produced in the same manner as in Example 9, except that hexamethylenediisocyanate (in the following, may be referred to as HDI) (trade name: TAKENATE 700, manufactured by Mitsui Chemicals, Inc) was used instead of PDI.

Comparative Example 4 (Preparation of Polyisocyanate Composition P)

A four-neck flask equipped with a stirrer, a thermometer, a reflux pipe, and a nitrogen inlet tube was charged with 500 parts by mass of HDI (trade name: TAKENATE 700, manufactured by Mitsui Chemicals, Inc) and 0.5 parts by mass of IBA, and the mixture was subjected to urethane-forming reaction at 80° C. for 2 hours. The isocyanate group content after the urethane-forming reaction was 49.9 mass %.

Then, 0.05 parts by mass of N-(2-hydroxypropyl)-N,N, N-trimethylammonium-2-ethylhexanoate was added as the isocyanurate-formation catalyst. The isocyanate group content was measured, and the reaction was continued until the content reached 45.0 mass % (that is, reaction rate of the isocyanate group 9.7% (isocyanate group conversion rate: 20%)). A predetermined conversion rate (conversion rate: 20%) was reached after 120 minutes, and 0.02 parts by mass of phosphoric acid was added to terminate the reaction. Thereafter, the temperature in the flask was increased to 160° C., and heat treatment was performed for 1 hour. The reaction mixture produced in this manner was allowed to pass through a thin film distillation device (temperature: 120° C., degree of vacuum: 0.093 kPa) to remove unreacted pentamethylenediisocyanate, and furthermore, relative to 100 parts by mass of the produced polyisocyanate composition, 0.02 parts by mass of o-toluenesulfonamide was added, thereby producing polyisocyanate composition P Comparative Example 5 (Preparation of Polyisocyanate Composition Q)

Polyisocyanate composition Q was produced in the same manner as in Comparative Example 4, except that the reaction was continued until reaction rate of the isocyanate group reached 15.1% (isocyanate group conversion rate of 31%).

Table 1 to 3 show formulation and characteristics of the polyisocyanate composition of Preparation Example 1, Examples 1 to 12, and Comparative Examples 1 to 5.

TABLE 1

| | | | Preparation Example No./Example No. | | | |
|---|---|---|---|---|---|---|
| | | | Preparation Example 1 | Example 1 | Example 2 | Example 3 |
| Formulation | Polyisocyanate composition | | a | A | B | C |
| | Isocyanate | PDI | 500 | 500 | 500 | 500 |
| | | HDI | — | — | — | — |
| | Alcohol | IBA | — | 6.9 | 6.9 | — |
| | | 1,3-BG | 0.3 | — | — | 4.0 |
| | Antioxidant | BHT | 0.3 | 0.3 | 0.3 | — |
| | | JP-333E | 0.3 | 0.3 | 0.3 | — |
| | Polyisocyanate composition | Preparation Example 1 | — | — | — | — |
| | | Example 9 | — | — | — | — |
| Characteristics | Isocyanate monomer concentration (mass %) | | 0.5 | 0.6 | 0.5 | 0.4 |
| | Isocyanate group content (mass %) | | 24.5 | 23.0 | 23.3 | 21.8 |
| | Viscosity (mPa · s) | | 2070 | 610 | 430 | 260 |
| | Uretdione bimolecular-product content (mass %) | | 0.4 | 8 | 12 | 28 |
| | Allophanate bimolecular-product content (mass %) | | — | 19 | 18 | — |
| | Ratio of bimolecular-product and trimolecular-product area (%) | | 64 | 68 | 68 | 60 |
| | Isocyanate trimolecular-product content (mass %) | | 64 | 41 | 38 | 32 |
| | Isocyanate quadmolecular-product content (mass %) | | 0 | 3.3 | 6.2 | 17 |
| | Ratio of Uretdione bimolecular-product to Isocyanate Trimolecular-product | | 0.01 | 0.20 | 0.32 | 0.88 |

TABLE 1-continued

|  |  |  | Example No. | | | |
| --- | --- | --- | --- | --- | --- | --- |
|  |  |  | Example 4 | Example 5 | Example 6 | Example 7 |
| Formulation | Polyisocyanate composition |  | D | E | F | G |
|  | Isocyanate | PDI | 500 | 500 | 500 | 500 |
|  |  | HDI | — | — | — | — |
|  | Alcohol | IBA | — | 25.0 | 0.5 | 0.5 |
|  |  | 1,3-BG | 4.0 | — | — | — |
|  | Antioxidant | BHT | — | — | — | — |
|  |  | JP-333E | — | — | — | — |
|  | Polyisocyanate composition | Preparation Example 1 | — | — | — | — |
|  |  | Example 9 | — | — | — | — |
| Characteristics | Isocyanate monomer concentration (mass %) |  | 0.5 | 0.5 | 0.2 | 0.2 |
|  | Isocyanate group content (mass %) |  | 22.7 | 22.4 | 25.3 | 24.6 |
|  | Viscosity (mPa · s) |  | 190 | 175 | 650 | 1310 |
|  | Uretdione bimolecular-product content (mass %) |  | 37 | 29 | 12 | 7 |
|  | Allophanate bimolecular-product content (mass %) |  | — | 25 | — | — |
|  | Ratio of bimolecular-product and trimolecular-product area (%) |  | 68 | 77 | 68 | 55 |
|  | Isocyanate trimolecular-product content (mass %) |  | 31 | 23 | 56 | 48 |
|  | Isocyanate quadmolecular-product content (mass %) |  | 14 | 11 | 6.1 | 3.5 |
|  | Ratio of Uretdione bimolecular-product to Isocyanate Trimolecular-product |  | 1.19 | 1.26 | 0.22 | 0.14 |

TABLE 2

|  |  |  | Example No. | | | | |
| --- | --- | --- | --- | --- | --- | --- | --- |
|  |  |  | Example 8 | Example 9 | Example 10 | Example 11 | Example 12 |
| Formulation | Polyisocyanate composition |  | H | I | J | K | L |
|  | Isocyanate | PDI | 500 | 500 | 500 | — | 500 |
|  |  | HDI | — | — | — | — | — |
|  | Alcohol | IBA | 0.5 | — | — | — | 0.8 |
|  |  | 1,3-BG | — | — | — | — | — |
|  | Antioxidant | BHT | — | 0.3 | — | — | — |
|  |  | JP-333E | — | 0.3 | — | — | — |
|  | Polyisocyanate composition | Preparation Example 1 | — | — | 164 | 220 | — |
|  |  | Example 9 | — | — | 336 | 280 | — |
| Characteristics | Isocyanate monomer concentration (mass %) |  | 0.2 | 0.5 | 0.5 | 0.5 | 0.4 |
|  | Isocyanate group content (mass %) |  | 24.2 | 26.5 | 25.8 | 25.6 | 24.7 |
|  | Viscosity (mPa · s) |  | 1570 | 24 | 76 | 125 | 70 |
|  | Uretdione bimolecular-product content (mass %) |  | 5 | 89 | 60 | 50 | 51 |
|  | Allophanate bimolecular-product content (mass %) |  | — | — | — | — | — |
|  | Ratio of bimolecular-product and trimolecular-product area (%) |  | 48 | 98 | 87 | 83 | 81 |
|  | Isocyanate trimolecular-product content (mass %) |  | 43 | 9 | 26.9 | 33 | 30 |
|  | Isocyanate quadmolecular-product content (mass %) |  | 3.0 | 2.0 | 1.3 | 1.1 | 11 |
|  | Ratio of Uretdione bimolecular-product to Isocyanate Trimolecular-product |  | 0.12 | 10.11 | 2.23 | 1.51 | 1.70 |

TABLE 3

|  |  |  | Comparative Example No. | | | | |
| --- | --- | --- | --- | --- | --- | --- | --- |
|  |  |  | Comparative Example 1 | Comparative Example 2 | Comparative Example 3 | Comparative Example 4 | Comparative Example 5 |
| Formulation | Polyisocyanate composition |  | M | N | O | P | Q |
|  | Isocyanate | PDI | — | 500 | — | — | — |
|  |  | HDI | — | — | 500 | 500 | 500 |
|  | Alcohol | IBA | — | — | — | 0.5 | 0.5 |
|  |  | 1,3-BG | — | — | — | — | — |
|  | Antioxidant | BHT | — | 0.3 | 0.3 | — | — |
|  |  | JP-333E | — | 0.3 | 0.3 | — | — |
|  | Polyisocyanate composition | Preparation Example 1 | 491 | — | — | — | — |
|  |  | Example 9 | 9 | — | — | — | — |

TABLE 3-continued

|  | | Comparative Example 1 | Comparative Example 2 | Comparative Example 3 | Comparative Example 4 | Comparative Example 5 |
|---|---|---|---|---|---|---|
| Characteristics | Isocyanate monomer concentration (mass %) | 0.5 | 0.6 | 0.5 | 0.2 | 0.2 |
| | Isocyanate group content (mass %) | 24.5 | 27.1 | 24.3 | 23.2 | 22.5 |
| | Viscosity (mPa · s) | 1230 | 22 | 26 | 600 | 1280 |
| | Uretdione bimolecular-product content (mass %) | 2 | 98 | 86 | 12 | 7 |
| | Allophanate bimolecular-product content (mass %) | — | — | — | — | — |
| | Ratio of bimolecular-product and trimolecular-product area (%) | 65 | 100 | 96 | 72 | 59 |
| | Isocyanate trimolecular-product content (mass %) | 63 | 2 | 10 | 60 | 52 |
| | Isocyanate quadmolecular-product content (mass %) | 0 | 0.2 | 1.8 | 5.0 | 5.4 |
| | Ratio of Uretdione bimolecular-product to Isocyanate Trimolecular-product | 0.03 | 65.33 | 8.35 | 0.20 | 0.13 |

[Details of the Abbreviation in Tables 1 to 3]

Details of the abbreviations used in Tables 1 to 3 are shown below
PDI: 1,5-pentamethylenediisocyanate
HDI: 1,6-hexamethylenediisocyanate
IBA: Isobutylalcohol
1,3-BG: 1,3-butanediol
BHT: 2,6-di (tert-butyl)-4-methylphenol (hindered phenol antioxidant (reaction stabilizer))
JP-333E: tris (tridecyl) phosphite (antioxidant (promoter), manufactured by Johoku Chemical Co. Ltd.)

Examples 13 to 24 and Comparative Examples 6 to 10 (Production of Polyurethane Resin)

As a base coat, polyisocyanate composition a produced in Preparation Example 1 and acrylic polyol (trade name: OLESTER QB1528T, hydroxyl number 120 mgKOH/g) were blended at a ratio such that the equivalent ratio (NCO/OH) of the isocyanate group in the polyisocyanate composition relative to the hydroxyl group in the polyol was 1.0, and furthermore, butyl acetate was added so that the viscosity of the mixture liquid was 30 to 50 mPa·s, and the mixture was stirred. Then, the mixture liquid was applied by spraying on a standard test plate (type: electroplating zinc steel plate, tin plane, and glass plate)(hereinafter abbreviated as test plate) in conformity with JIS G 3313 and JIS K 5600-1-4 so that the film thickness was about 15 μm, and it was dried at 80° C. for 5 minutes. Thereafter, as a clear coat, the polyisocyanate composition produced in Examples 1 to 12 and Comparative Examples 1 to 5 and acrylic polyol (trade name: OLESTER QC414T, hydroxyl number 120 mgKOH/g) were blended at a ratio such that the equivalent ratio (NCO/OH) of the isocyanate group in the polyisocyanate composition relative to the hydroxyl group in the polyol was 1.0, and furthermore, butyl acetate was added so that the viscosity of the mixture liquid was 30 to 50 mPa·s. Thereafter, as the catalyst, DBTDL (dibutyltin dilaurate (IV) (manufactured by Wako Pure Chemical Industries, Ltd.)) was blended in an amount of 50 ppm relative to the solid content of acrylic polyol, and the mixture was stirred. Then, the mixture liquid was applied by spraying so that the film thickness was about 35 μm, and thereafter dried at 80° C. for 30 minutes, thereby producing polyurethane resin.

The produced polyurethane resin was allowed to stand in a room with a temperature of 23° C. and a relative humidity of 55% for 7 days.

<Physical Properties Evaluation>

Physical properties of the polyurethane resin produced in Examples 13 to 24 and Comparative Examples 6 to 10 were measured in accordance with the following method. Table 4 shows the result.

<Smoothness>

Smoothness was evaluated with Short wave (Sw) mode and Long wave (Lw) mode using Wave-scan dual manufactured by BYK-Gardner.

<Martens Hardness (unit: N/mm$^2$)>

The Martens hardness (HMs) of the coating that was in contact with the test plate was measured with the following conditions using a dynamic ultra micro hardness tester, and evaluated.
Test device: DUH-211 (manufactured by Shimadzu Corporation)
Indenter type: Triangular 115
Test mode: load-unload test
Test conditions: testing force: 10.00 mN, load rate: 3.0 mN/sec, load retention time: 10 sec <Adherence>

Initial adherence test (before accelerated weatherability test) in accordance with JIS K5600-5-6 (1999) was performed. Then, accelerated weatherability test was performed in accordance with method A of JIS K5600-7-8 (1999) for 1000 hours. Thereafter, adherence test was performed after allowing it to stand in a room having a temperature of 23° C. and 50% RH for 1 hour, and the result was defined as adherence after accelerated weatherability test. Adherence before and after accelerated weatherability test was evaluated.

<Chemical Resistance>

Gauze was immersed with methyl ethyl ketone, and a load of 100 g was applied. The gauze was moved back and forth on the surface of the coating on a glass substrate. The reciprocation time until the coating was peeled or broken was evaluated as chemical resistance.

<Bending Resistance>

Bend test was performed in accordance with JIS K 5600-5-1 (1999).

The mandrel used had a diameter at minimum of 2 mm, and when there was no peeling occurred even with the mandrel with 2 mm in bend test, it was evaluated as 2 mm/no peeling.

TABLE 4

| | Example 13 | Example 14 | Example 15 | Example 16 | Example 17 |
|---|---|---|---|---|---|
| Polyurethane resin | A | B | C | D | E |
| Smoothness Sw | 5.6 | 5.4 | 4.8 | 4.5 | 4.5 |
| Lw | 23.0 | 21.9 | 17.2 | 14.9 | 14.6 |
| Hardness (N/mm$^2$) | 86 | 82 | 78 | 77 | 77 |
| Adherence Initial | 0 | 0 | 0 | 0 | 0 |
| After test | 0 | 0 | 0 | 0 | 0 |
| Chemical resistance | 120 | 110 | 105 | 100 | 100 |
| Bending resistance (mandrel diameter/ presence or absence of peeling) | 2 mm no peeling | 2 mm no peeling | 3 mm peeling occurred | 3 mm peeling occurred | 2 mm no peeling |

| | Example 18 | Example 19 | Example 20 | Example 21 | Example 22 |
|---|---|---|---|---|---|
| Polyurethane resin | F | G | H | I | J |
| Smoothness Sw | 5.5 | 5.7 | 6.0 | 4.3 | 4.4 |
| Lw | 22.2 | 23.4 | 25.1 | 13.1 | 13.5 |
| Hardness (N/mm$^2$) | 85 | 89 | 90 | 64 | 66 |
| Adherence Initial | 0 | 0 | 0 | 0 | 0 |
| After test | 0 | 0 | 0 | 0 | 0 |
| Chemical resistance | 120 | 130 | 140 | 65 | 70 |
| Bending resistance (mandrel diameter/ presence or absence of peeling) | 4 mm peeling occurred | 4 mm peeling occurred | 4 mm peeling occurred | 4 mm peeling occurred | 4 mm peeling occurred |

| | Example 23 | Example 24 | Comparative Example 6 | Comparative Example 7 | Comparative Example 8 |
|---|---|---|---|---|---|
| Polyurethane resin | K | L | M | N | O |
| Smoothness Sw | 4.4 | 4.4 | 7.0 | 4.0 | 4.9 |
| Lw | 14.0 | 13.7 | 30.1 | 12.0 | 18.1 |
| Hardness (N/mm$^2$) | 70 | 70 | 92 | 48 | 58 |
| Adherence Initial | 0 | 0 | 0 | 0 | 0 |
| After test | 0 | 0 | 4 | 0 | 0 |
| Chemical resistance | 80 | 80 | 150 | 40 | 55 |
| Bending resistance (mandrel diameter/ presence or absence of peeling) | 4 mm peeling occurred | 4 mm peeling occurred | 5 mm peeling occurred | 5 mm peeling occurred | 4 mm peeling occurred |

| | Comparative Example 9 | Comparative Example 10 |
|---|---|---|
| Polyurethane resin | P | Q |
| Smoothness Sw | 5.5 | 6.5 |
| Lw | 22.7 | 27.3 |
| Hardness (N/mm$^2$) | 65 | 73 |
| Adherence Initial | 0 | 0 |
| After test | 0 | 0 |
| Chemical resistance | 60 | 85 |
| Bending resistance (mandrel diameter/ presence or absence of peeling) | 4 mm peeling occurred | 4 mm peeling occurred |

Example 25 (Preparation of Aqueous Polyurethane Resin Composition (Aqueous Polyurethane Dispersion))

245 parts by mass of ion-exchange water adjusted in advance to 20° C. and 1000 parts by mass of TAKELAC W-635 (nonionic aqueous polyurethane resin (hydrophilic group-containing active hydrogen compound having nonionic group), manufactured by Mitsui Chemicals, Inc) were put into a 3 L—volume stainless steel vessel, and while stirring the mixture with homodisper (trade name: T.K. homodisper, manufactured by PRIMIX Corporation) at 2000 rpm, 15 parts by mass of polyisocyanate composition L produced in Example 12 with its temperature adjusted in advance to 20° C. was gradually added. The stirring was continued even after the addition for 30 minutes, thereby producing an aqueous polyurethane resin composition (aqueous polyurethane dispersion).

Example 26 (Production of Aqueous Polyurethane Resin)

The aqueous polyurethane resin composition produced in Example 25 was applied on a polycarbonate substrate so that the film thickness was 10 μm, and it was dried at 80° C. for 30 minutes, thereby producing an aqueous polyurethane resin. The produced aqueous polyurethane resin was allowed to stand in a room having a temperature of 23° C. and a relative humidity of 55% for 7 days.

The initial adherence test (before water resistant test) was performed in accordance with JIS K5600-5-6 (1999). As a result, the classification was 0. Then, immersion in hot water of 60° C. for 30 minutes was performed as water resistance test. Thereafter, adherence test was performed after allowing to stand in a room having a temperature of 23° C. and 50% RH for 1 hour. As a result, the classification was 0.

While the illustrative embodiments of the present invention are provided in the above description, such is for illustrative purpose only and it is not to be construed as limiting in any manner. Modification and variation of the present invention that will be obvious to those skilled in the art is to be covered by the following claims.

INDUSTRIAL APPLICABILITY

The polyisocyanate composition of the present invention is useful as a material for polyurethane resin, the polyurethane resin produced from the polyisocyanate composition of the present invention can be used in a wide range in various industrial fields.

The invention claimed is:

1. A polyisocyanate composition comprising at least a pentamethylenediisocyanate derivative, wherein the polyisocyanate composition contains 5 mass % or more and 95 mass % or less of a uretdione derivative composed of an isocyanate bimolecular-product of pentamethylenediisocyanate relative to a total amount of the polyisocyanate composition, and also contains 3 mass % or more and 20 mass % or less of an isocyanate quadmolecular-product of the pentamethylenediisocyanate relative to the total amount of the polyisocyanate composition.

2. The polyisocyanate composition of claim 1, containing 10 mass % or more and 95 mass % or less of the uretdione derivative composed of an isocyanate bimolecular-product of the pentamethylenediisocyanate relative to the total amount of the polyisocyanate composition.

3. The polyisocyanate composition of claim 1, wherein a total amount of pentamethylenediisocyanate uretdione bimolecular-product, allophanate bimolecular-product, and isocyanate trimolecular-product relative to the total amount of the polyisocyanate composition, which is represented by, in a chromatogram of the polyisocyanate composition in gel permeation chromatograph measurement, the ratio of the peak area having a peak top between 280 to 490 of polyethylene glycol-based molecular weight relative to a total peak area, is 50 mass % or more and 80 mass % or less.

4. The polyisocyanate composition of claim 1, containing 10 mass % or more and 55 mass % or less of an isocyanate trimolecular-product of pentamethylenediisocyanate relative to the total amount of the polyisocyanate composition.

5. Polyurethane resin comprising a reaction product of the polyisocyanate composition of claim 1 and an active hydrogen group-containing compound.

6. A method for producing polyurethane resin, the method including allowing the polyisocyanate composition of claim 1 to react with an active hydrogen group-containing compound.

7. A coating comprising the polyurethane resin of claim 5.

* * * * *